US012576645B2

(12) United States Patent
Shimada et al.

(10) Patent No.: US 12,576,645 B2
(45) Date of Patent: Mar. 17, 2026

(54) WASTE INK TANK AND PRINTING APPARATUS IN WHICH THE TANK INCLUDES A SUBSTANTIALLY BOX-SHAPED CONTAINER PROVIDED WITH AN INSERTION PORT THAT CAN BE SHIELDED

(71) Applicant: CANON KABUSHIKI KAISHA, Tokyo (JP)

(72) Inventors: Koki Shimada, Kanagawa (JP); Toshiaki Somano, Kanagawa (JP); Yuta Araki, Chiba (JP); Kaori Katayama, Tokyo (JP); Yusuke Tanaka, Kanagawa (JP); Tetsu Hamano, Tokyo (JP); Erika Iyama, Kanagawa (JP); Fumie Kameyama, Tokyo (JP); Nobuhiro Toki, Kanagawa (JP); Yasuyuki Takanaka, Kanagawa (JP); Daiju Takeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 18/465,118

(22) Filed: Sep. 11, 2023

(65) Prior Publication Data

US 2024/0092084 A1 Mar. 21, 2024

(30) Foreign Application Priority Data

Sep. 15, 2022 (JP) ................................ 2022-147157
Sep. 15, 2022 (JP) ................................ 2022-147253
Sep. 15, 2022 (JP) ................................ 2022-147406

(51) Int. Cl.

*B41J 2/17* (2006.01)
*B41J 2/185* (2006.01)
*B41J 29/13* (2006.01)

(52) U.S. Cl.

CPC ............ *B41J 2/1721* (2013.01); *B41J 2/185* (2013.01); *B41J 29/13* (2013.01); *B41J 2002/1856* (2013.01)

(58) Field of Classification Search

CPC . B41J 2/1721; B41J 2/185; B41J 29/13; B41J 2/1752; B41J 2/17523; B41J 2/17526; B41J 2/17553; B41J 2/17503

See application file for complete search history.

(56) References Cited

U.S. PATENT DOCUMENTS 8,454,122 B2 * 6/2013 Kubo .................. B41J 2/16523 347/36
2006/0023022 A1 2/2006 Toki et al. ............... B41J 2/165

(Continued)

FOREIGN PATENT DOCUMENTS

JP 2020-146921 9/2020
JP 2021-030567 3/2021

(Continued)

OTHER PUBLICATIONS

Extended European Search Report dated Mar. 5, 2024 in counterpart EP Application No. 23197382.7.

*Primary Examiner* — Sharon Polk
(74) *Attorney, Agent, or Firm* — Venable LLP

(57) ABSTRACT

A waste ink tank including a container portion that is substantially box-shaped and is provided with an insertion port, into which a discharge member discharging waste ink can be inserted and pulled out from, and a shielding portion movable between a shielding position where the insertion port is shielded and an open position where the insertion port is opened. The insertion port is provided on a side surface of the box-shaped container portion.

19 Claims, 18 Drawing Sheets

(56) References Cited

U.S. PATENT DOCUMENTS

| | | | | |
|---|---|---|---|---|
| 2007/0076046 | A1 | 4/2007 | Toki | B41J 2/165 |
| 2007/0211103 | A1 | 9/2007 | Hamano | B41J 2/165 |
| 2008/0231659 | A1 | 9/2008 | Toki et al. | B41J 2/14 |
| 2009/0256884 | A1 | 10/2009 | Aoki | B41J 2/165 |
| 2013/0063520 | A1 | 3/2013 | Muraki | B41J 2/165 |
| 2018/0345674 | A1 | 12/2018 | Ochiai | B41J 2/17 |
| 2019/0232677 | A1* | 8/2019 | Aoki | B41J 2/16523 |
| 2020/0247128 | A1 | 8/2020 | Tanaka | B41J 2/165 |
| 2020/0290380 | A1 | 9/2020 | Miyagawa et al. | B41J 25/006 |
| 2020/0316951 | A1 | 10/2020 | Narazaki et al. | B41J 2/175 |
| 2021/0016573 | A1 | 1/2021 | Kimura et al. | B41J 2/165 |
| 2021/0213765 | A1 | 7/2021 | Tamamori et al. | B41J 29/17 |
| 2022/0111656 | A1 | 4/2022 | Takenaga et al. | B41J 2/17 |

FOREIGN PATENT DOCUMENTS

| | | |
|---|---|---|
| JP | 2021-109415 | 8/2021 |
| WO | 2021/054298 | 3/2021 |

* cited by examiner

WASTE INK TANK AND PRINTING APPARATUS IN WHICH THE TANK INCLUDES A SUBSTANTIALLY BOX-SHAPED CONTAINER PROVIDED WITH AN INSERTION PORT THAT CAN BE SHIELDED

CROSS-REFERENCE TO PRIORITY APPLICATION

This application claims the benefit of Japanese Patent Applications No. 2022-147406, No. 2022-147253, and No. 2022-147157, filed on Sep. 15, 2022, respectively, which are hereby incorporated by reference herein in their entirety.

BACKGROUND OF THE INVENTION

Field of the Invention

The present invention relates to a waste ink tank that reserves waste ink and is provided replaceably in an apparatus and a printing apparatus with the waste ink tank.

Description of the Related Art

A printing apparatus that ejects ink to perform printing includes a recovery portion for maintaining and recovering ink ejection performance satisfactorily. In such a printing apparatus, a waste ink tank for storing waste ink received in the recovery portion is provided replaceably.

Japanese Patent Laid-Open No. 2021-109415 discloses a technique in which a storage portion that stores a waste ink tank includes a shielding member that shields a discharge portion that discharges waste ink to the waste ink tank in order to suppress adhesion of waste ink to hands, clothes, and the like, at the time of replacing of the waste ink tank.

However, in the technique disclosed in Japanese Patent Laid-Open No. 2021-109415, there is a possibility of contacting an opening portion through which waste ink is introduced of the waste ink tank removed from the storage portion and resulting in adhesion of waste ink to hands, clothes, and the like.

SUMMARY OF THE INVENTION

The present invention provides a waste ink tank that can be replaced properly.

In a first aspect, the present invention provides a waste ink tank comprising a container portion provided with an insertion port which a discharge member discharging waste ink can be inserted into and pulled out from and a shielding portion movable between a shielding position where the insertion port is shielded and an open position where the insertion port is opened.

In a second aspect of the present invention a printing apparatus comprises a printing unit configured to eject ink to perform printing, a recovery unit configured to maintain and recover ink ejection performance in the printing unit satisfactorily, a storage portion configured to store a waste ink tank, and a discharge member configured to be able to be inserted into and pulled out from an insertion port provided in the waste ink tank and capable of discharging waste ink received by the recovery unit to the waste ink tank, wherein the waste ink tank comprises a shielding portion movable between a shielding position where the insertion port is shielded and an open position where the insertion port is opened, and wherein the storage portion moves the shielding portion from the shielding position to the open position in a case where the waste ink tank is inserted.

According to the present invention, it is possible to replace a waste ink tank properly.

Further features of the present invention will become apparent from the following description of exemplary embodiments with reference to the attached drawings.

DESCRIPTION OF THE EMBODIMENTS

A description will be given of an example of embodiments for a waste ink tank and a printing apparatus in detail below with reference to the accompanying drawings. It should be noted that the following embodiments do not limit the present invention, and not all combinations of features described in the present embodiment are essential to a solution to the problem to be solved by the present invention. Further, the positions, shapes, and the like, of the constituent elements described in the embodiments are merely examples and are not intended to limit the scope of the present invention only to them.

Printing Apparatus

A printing apparatus with a waste ink tank according to the present embodiment may be an apparatus having only the function of printing an image on a print medium, or a multifunction device having the function of reading an image. In the following description, a multifunction device that has the function of reading an image and can print an image on a print medium will be described as an example of the printing apparatus with the waste ink tank according to the present embodiment.

Figure 1A:
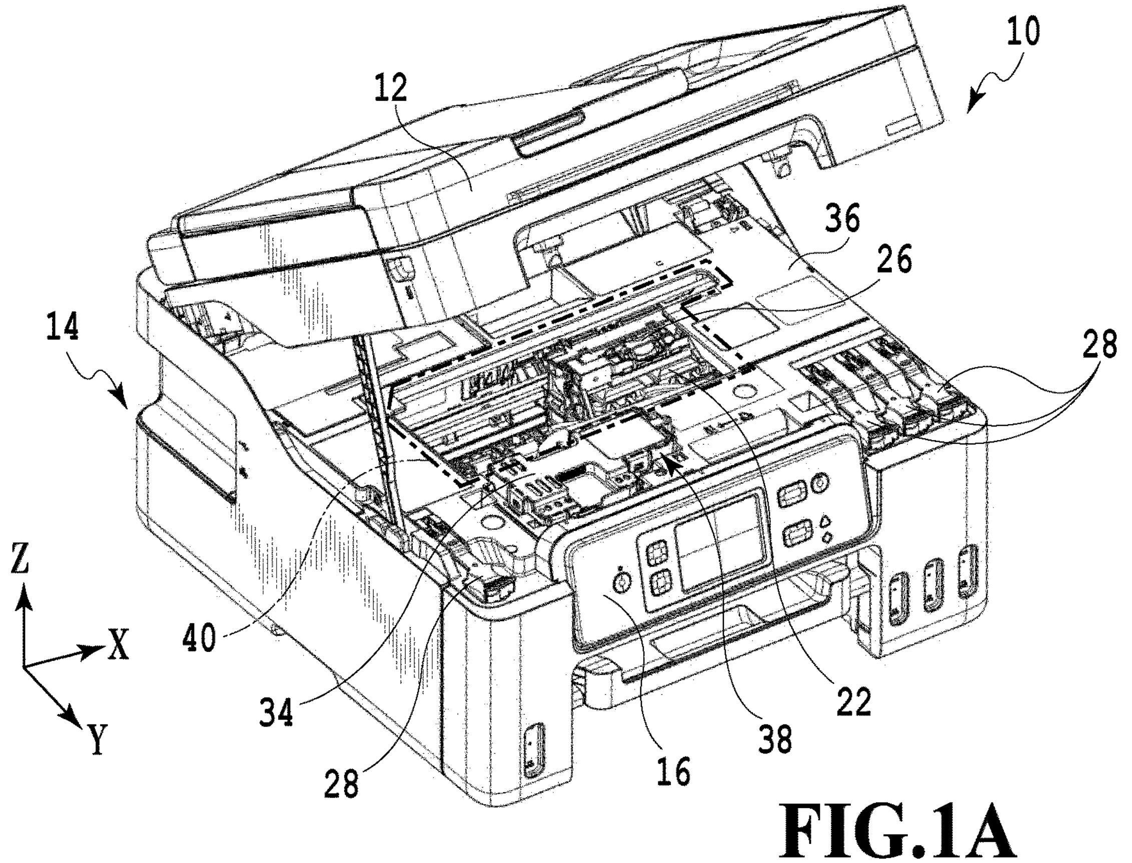
FIGS. 1A and 1B are schematic configuration diagrams of a printing apparatus.
Figure 1B:
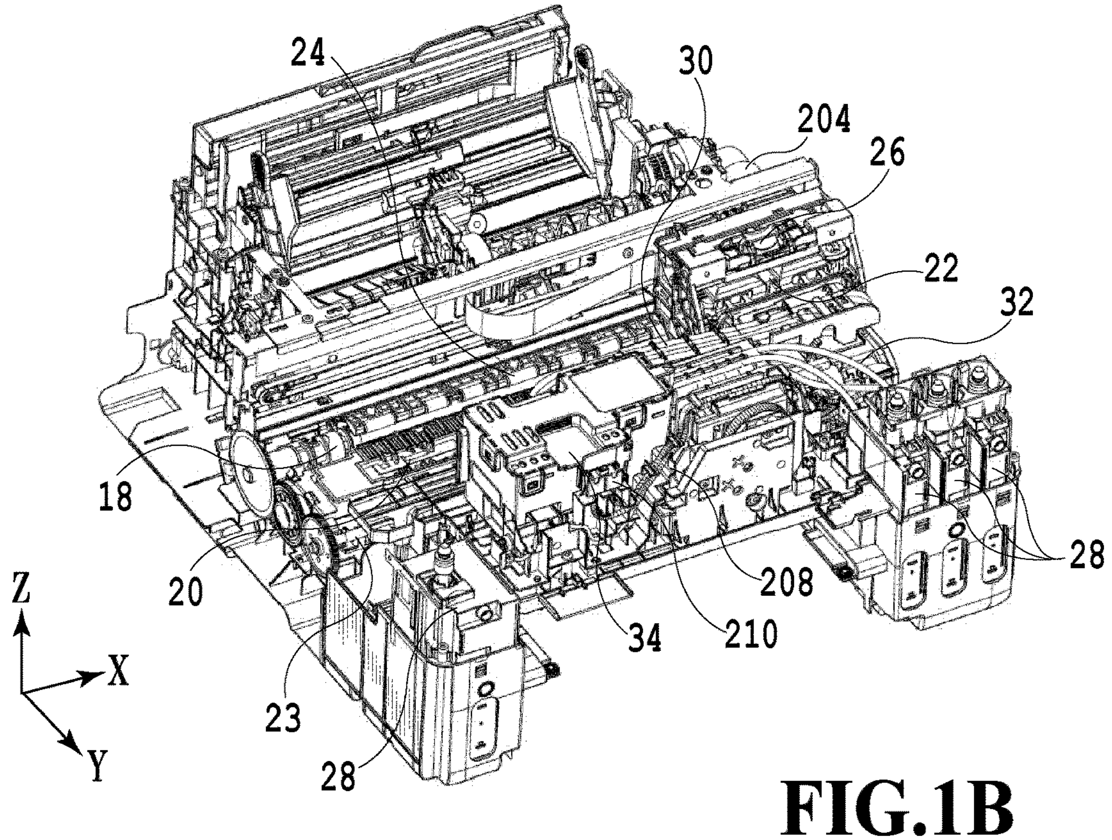
Figure 2:
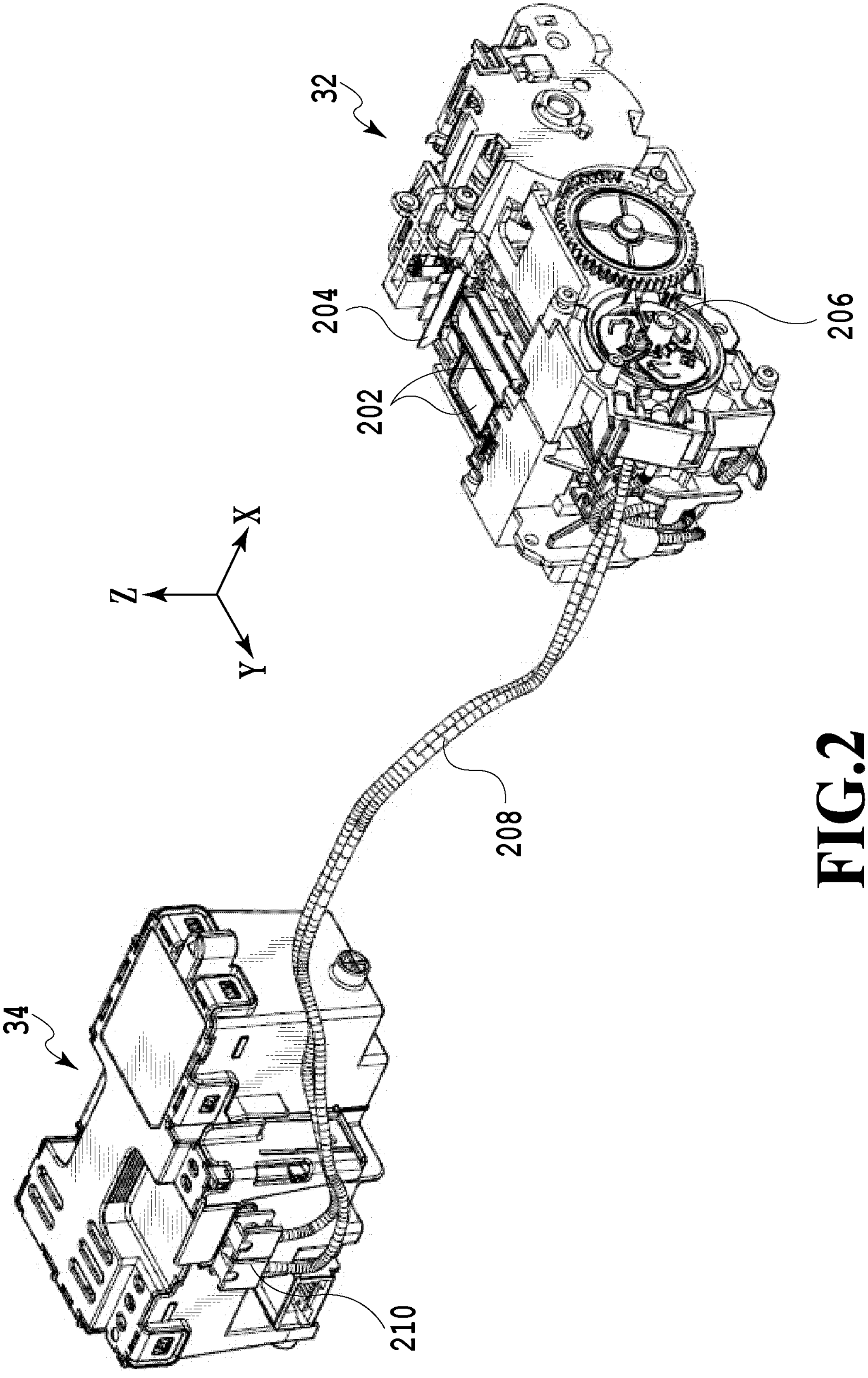
FIG. 2 is a schematic configuration diagram of a recovery portion and a waste ink tank.

FIGS. 1A and 1B are configuration diagrams of the printing apparatus according to the present embodiment. FIG. 1A is an external view of the printing apparatus with a reader opened and FIG. 1B is a schematic configuration diagram of a main portion of a printing portion. FIG. 2 is a schematic configuration diagram of a recovery portion and the waste ink tank.

Here, directions used in the present specification will be described. In the present specification, a description will be given on the assumption that, in a case when an operator faces the printing apparatus, a direction from a left side to a right side of the apparatus is an X direction, a direction from a back side to a front side is a Y direction, and a direction from a lower side to an upper side is a Z direction. Thus, the X direction, the Y direction, and the Z direction are directions from one side to the other side and will be indicated with "+ (plus)" as appropriate, and the X direction, the Y direction, and the Z direction from the other side to one side will be indicated with "– (minus)."

A printing apparatus 10 includes a reader 12 capable of reading an image on a document, a printing portion 14 capable of printing an image on a print medium based on image data, and an operation portion 16 that receives an input of an instruction from a user and can display various kinds of information. The reader 12 is provided above the printing portion 14 so as to be openable and closable. Incidentally, since various publicly-known techniques can be used for the configurations of the reader 12 and the operation portion 16, the detailed descriptions thereof will be omitted in the following description.

The printing portion 14 includes a conveyance roller 18 that conveys a fed print medium, a platen 20 that supports the print medium conveyed by the conveyance roller 18, and a print head 22 that ejects ink onto the print medium supported by the platen 20 to perform printing. The printing portion 14 also includes a discharge roller 23 that discharges the print medium printed by the print head 22 to a tray (not shown).

The printing portion 14 includes a pinch roller 24 that is pressed against and is associated with the conveyance roller 18, and a print medium is pinched between the conveyance roller 18 and the pinch roller 24, and can be conveyed in the +Y directions. The print head 22 is detachably mounted on a carriage 26 provided movably in the +X directions. Accordingly, in the printing portion 14, the print head 22 is configured to be movable in the +X directions via the carriage 26. The platen 20 extends in the X direction a length corresponding to the length in a width direction of a printable print medium.

After a print medium is conveyed to a print start position by the conveyance roller 18, the printing portion 14 performs a printing operation in which ink is ejected onto the print medium while the print head 22 is moved in the X direction (or the –X direction) to perform printing. Next, a conveyance operation in which the conveyance roller 18 conveys the print medium by a predetermined amount in the Y direction is performed, an unprinted area is located in a position opposite to the print head 22, and the printing operation is performed again. Alternately and repeatedly executing the printing operation and the conveyance operation in this way, the print medium is printed in the printing portion 14.

The printing portion 14 includes an ink tank 28 that stores ink to be supplied to the print head 22 on the other side in the Y direction. The ink tank 28 is connected to the print head 22 through a tube 30, and ink stored in the ink tank 28 is supplied to the print head 22 through the tube 30. In a position opposite to the print head 22 in a standby position, the printing portion 14 also includes a recovery portion 32 that executes a recovery operation for maintaining and recovering the ink ejection performance of the print head 22 satisfactorily. Incidentally, the standby position is a position where the print head 22 is on standby while printing is not performed and is, for example, a position near the end on the other side in the X direction in an area where the print head 22 moves including the carriage 26 (hereafter simply referred to as "the movement area where the print head 22 moves" or "the movement area where a printing unit U moves (to be described later)"). The printing portion 14 further includes a waste ink tank 34 into which waste ink received at the recovery portion 32 is discharged. In the present embodiment, the waste ink tank 34 is stored in a storage portion 38 provided adjacent to the movement area where the print head 22 moves in a print medium conveyance direction, more specifically, adjacent to the other side in the Y direction of the movement area.

The recovery portion 32 includes a cap 202 that caps and protects an ejection port surface where an ink ejection port through which ink is ejected is formed in the print head 22, a wiper 204 for wiping off a deposit deposited on the ejection port surface, and a suction pump 206 for reducing pressure in the cap 202 (see FIG. 2). In the present embodiment, since black ink and color ink are ejected, the cap 202 includes a cap corresponding to an ejection port for ejecting black ink and a cap corresponding to an ejection port for ejecting color ink.

The suction pump 206 is connected to a discharging tube 208. The discharging tube 208 is connected at one end to the suction pump 206 and at the other end to the waste ink tank 34 via a connection portion 210. That is, the recovery portion 32 is connected to the waste ink tank 34 via the discharging tube 208. In the printing portion 14, waste ink received at the recovery portion 32 by, for example, executing various recovery operations is discharged to the waste ink tank 34 through the discharging tube 208. The connection portion 210 is provided with a needle portion 950 (see FIG. 9) and this needle portion 950 is inserted into an insertion port 408 (to be described later) of the waste ink tank 34, so that the discharging tube 208 is connected to the waste ink tank 34.

The upper surface of the printing portion 14 is formed by a cover member 36 (see FIG. 1A). Thus, in the printing apparatus 10, in a case when the reader 12 is opened, the cover member 36 is exposed to the outside. In the cover member 36, there is formed an opening 40 through which a portion of the movement area where the print head 22 moves and the storage portion 38 that stores the waste ink tank 34 are exposed. In the opening 40, the size of a portion where a portion of the movement area where the print head 22 moves is exposed, is large enough for a user to put the user's hand into the movement area, where the print head 22 moves, or the like, to remove a print medium, for example, in a case when paper-jamming (paper jam) occurs. In the opening 40, a portion where the storage portion 38 is exposed is large enough to insert the waste ink tank 34 into the storage portion 38 in the –Z direction (gravitational direction). The storage portion 38 is located on the other side in the Y direction of the movement area where the print head 22 moves and on one side in the X direction of the movement area. Thus, in the printing apparatus 10, in a case when the reader 12 is opened, the waste ink tank 34 is located in front of the movement area where the print head 22 moves, and a worker, such as a user, a repairman, etc., can easily replace the waste ink tank 34.

Configuration of a Control System for the Printing Apparatus

Figure 3:
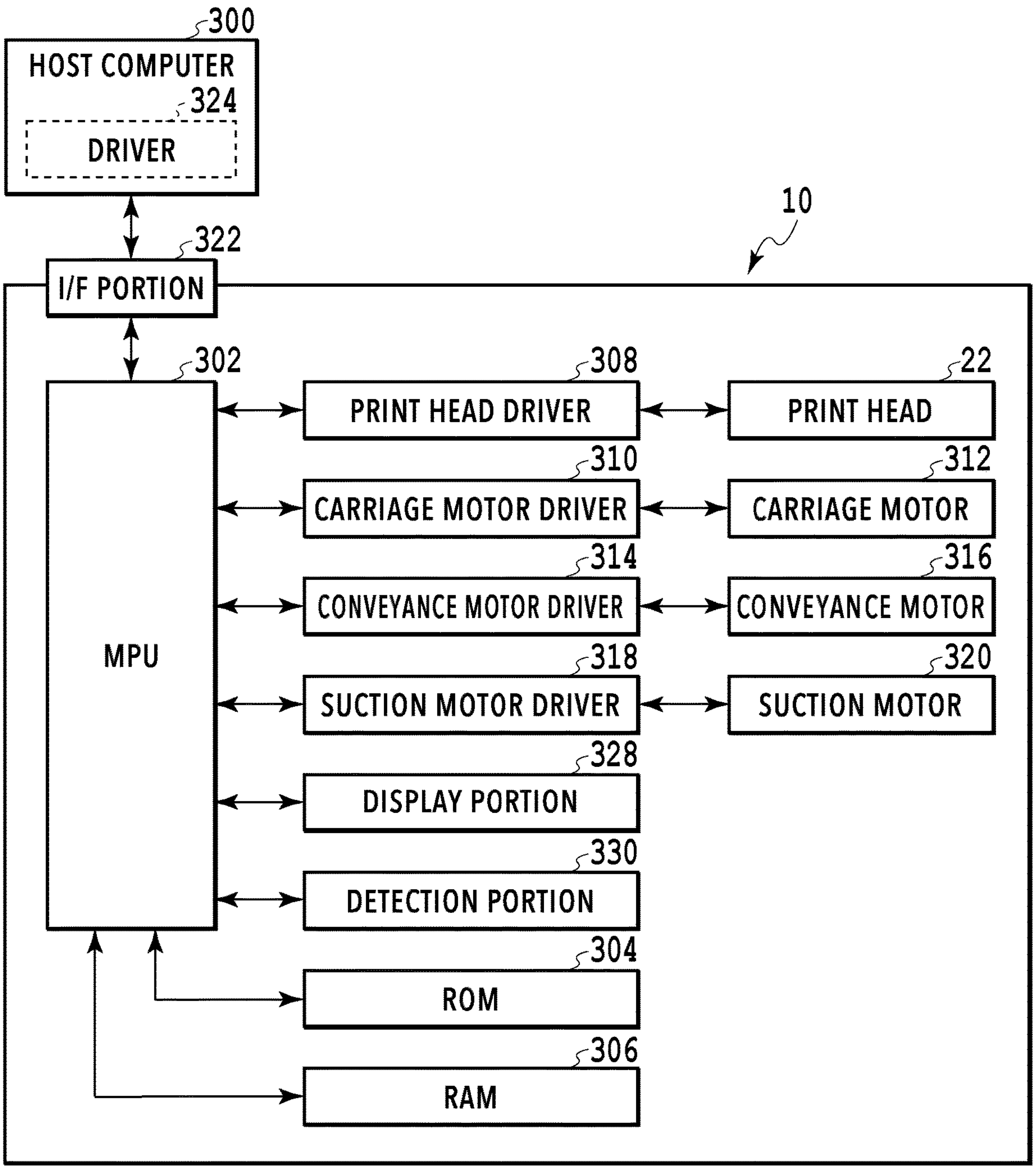
FIG. 3 is a block diagram showing a configuration of a control system for the printing apparatus.

Next, the configuration of a control system for the printing apparatus 10 will be described. FIG. 3 is a block diagram showing the configuration of the control system for the printing apparatus 10. Incidentally, FIG. 3 shows a main configuration with a focus on the printing portion 14 of the printing apparatus 10.

The printing apparatus 10 includes an MPU 302 that controls all operations in the printing apparatus 10, such as the operation of each constituent and data processing, and a ROM 304 that stores various programs and various kinds of data executed by the MPU 302. The printing apparatus 10 also includes a RAM 306 that temporarily stores processing data executed by the MPU 302 and data received from a host computer 300 (to be described later).

The MPU 302 is connected to a print head driver 308 to control driving of the print head 22 via the print head driver 308. The MPU 302 is also connected to a carriage motor driver 310 to control, via the carriage motor driver 310, driving of a carriage motor 312 that moves the carriage 26. Further, the MPU 302 is connected to a conveyance motor driver 314 to control, via the conveyance motor driver 314, driving of a conveyance motor 316 that drives the conveyance roller 18 and the discharge roller 23. Furthermore, the MPU 302 is connected to a suction motor driver 318 to control a suction motor 320 that drives the suction pump 206 via the suction motor driver 318.

The MPU 302 is connected to an interface (I/F) portion 322 and is connected to the host computer 300 via the I/F portion 322. The host computer 300 is provided with a driver 324 for collecting print information such as a print image and print quality and communicating with the printing apparatus 10 in a case where instructions to start printing are given by a user. The MPU 302 is also connected to a display portion 328 to control display on the operation portion 16 via the display portion 328. Further, the MPU 302 is connected to a detection portion 330 capable of detecting the amount of waste ink discharged to the waste ink tank 34. Based on a result of detection by the detection portion 330, the MPU 302 makes a notification to, for example, prompt for replacement of the waste ink tank 34 via the display portion 328.

Waste Ink Tank

Figure 4:
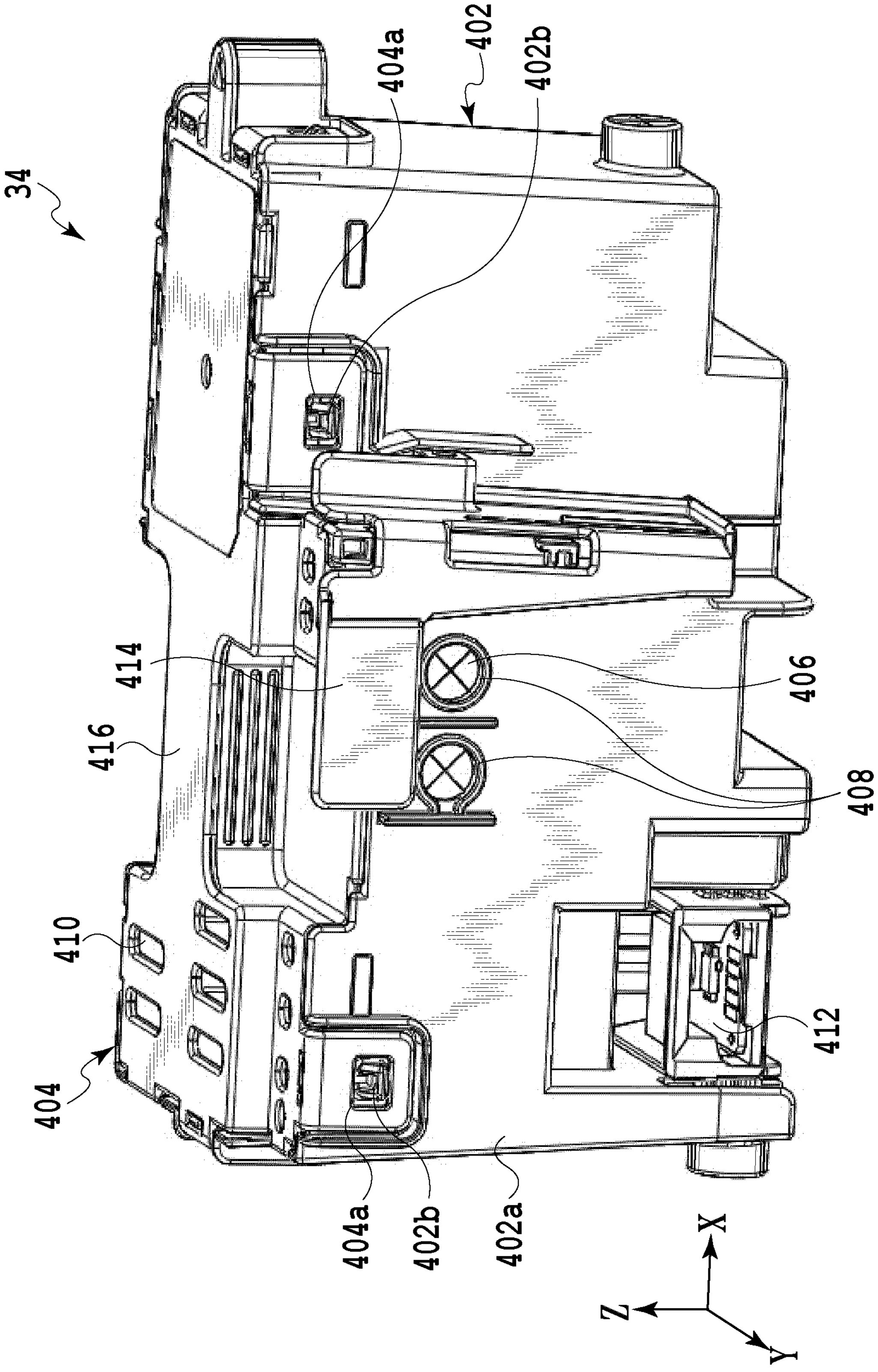
FIG. 4 is a perspective configuration diagram of the waste ink tank.

Next, the configuration of the waste ink tank 34 will be described in detail. FIG. 4 is a perspective configuration diagram of the waste ink tank 34. In the present specification, in the figures showing the waste ink tank 34, the X direction, Y direction, and Z direction in the figures indicate directions in the case of storing the waste ink tank 34 in the storage portion 38. The waste ink tank 34 is replaced with a new waste ink tank 34 by an operator based on, for example, a notification displayed on the operation portion 16 to prompt for replacement of the waste ink tank 34.

The waste ink tank 34 includes a substantially box-shaped container portion 402 (see FIG. 7) with a top opened and a lid portion 404 detachably fixed to the container portion 402 so as to cover the top opening of the container portion 402. The waste ink tank 34 also includes an absorbent 406 (see FIG. 7) that is contained in the container portion 402 and capable of absorbing waste ink.

The container portion 402 is provided with the insertion port 408 opened so that the needle portion 950 (see FIG. 9) provided in the connection portion 210 (see FIG. 2) can be inserted and pulled out on a side surface 402*a* located on the other side in the Y direction in a case when the waste ink tank 34 is stored in the storage portion 38. Incidentally, the absorbent 406 contained in the container portion 402 is exposed from the opening of the insertion port 408. In the present embodiment, two insertion ports 408 are provided along the X direction. The needle portion 950 for discharging black waste ink is inserted into one insertion port 408, and the needle portion 950 for discharging color waste ink is inserted into the other insertion port 408.

Here, although details will be described later, in the case of storing the waste ink tank 34 in the storage portion 38, first, the waste ink tank 34 is inserted in the −Z direction from a position corresponding to the storage portion 38 of the opening 40. After that, the waste ink tank 34 is moved in the Y direction, and the needle portion 950 is inserted into the insertion port 408. That is, in the present embodiment, in a case when the waste ink tank 34 is stored in the storage portion 38, the needle portion 950 of the connection portion 210 is inserted into the insertion port 408. Waste ink is then discharged from the needle portion 950 into the container portion 402 through the discharging tube 208, and the discharged waste ink is absorbed into the absorbent 406. As described above, in the present embodiment, the needle portion 950 functions as a discharge member that discharges waste ink to the waste ink tank 34.

Further, the side surface 402*a* of the container portion 402 is provided with a connection terminal 412 that can be electrically connected to a connection terminal (not shown) provided in the storage portion 38 in a case when the waste ink tank 34 is stored in the storage portion 38. The connection terminal 412 is provided closer to one side in the Z direction than to the insertion port 408 and in a position different from that of the insertion port 408 in the X direction. Thus, even in a case when waste ink leaks from the insertion port 408, the leaking waste ink does not easily reach the connection terminal 412. The MPU 302 detects that the waste ink tank 34 is stored in the storage portion 38 by detecting that the connection terminal in the storage portion 38 is connected to the connection terminal 412 based on a result of detection by the detection portion 330. On the other hand, the MPU 302 detects that the waste ink tank 34 is removed from the storage portion 38 by detecting that the connection between the connection terminal in the storage portion 38 and the connection terminal 412 is released based on a result of detection by the detection portion 330. In the case of detecting that a waste ink tank 34 is newly stored in the storage portion 38, the MPU 302 stores the amount of waste ink stored in the newly attached waste ink tank 34.

A shielding portion 414 capable of shielding and opening the insertion port 408 is provided on the side surface 402*a* of the container portion 402. The shielding portion 414 is configured to be movable between a shielding position and an open position. The shielding portion 414 shields the insertion port 408 from the outside by being located in the shielding position where the insertion port 408 is shielded. As a result, the absorbent 406 exposed from the insertion port 408 is shielded from the outside. In addition, the shielding portion 414 brings about a state where the insertion port 408 is exposed by being located in the open position where the insertion port 408 is opened. As a result, the absorbent 406 is exposed to the outside from the insertion port 408.

The lid portion 404 is provided with an opening 410 for accelerating the evaporation of waste ink absorbed into the absorbent 406 inside the container portion 402. The lid portion 404 includes, for example, a plurality of hole sections 404*a* that can be fitted to a plurality of claw portions 402*b* provided in the container portion 402 (see FIG. 7). The hole sections 404*a* are fitted to the claw portions 402*b*, so that the lid portion 404 is fixed to the container portion 402 (see FIG. 4). Incidentally, a fixing mechanism for fixing the lid portion 404 to the container portion 402 is not limited to this. In the lid portion 404, a gripping portion 416 that can be gripped by an operator is formed. The operator thus can grip the gripping portion 416 of the lid portion 404 fixed to the container portion 402 to move the waste ink tank 34.

Absorbent

Figure 5A:
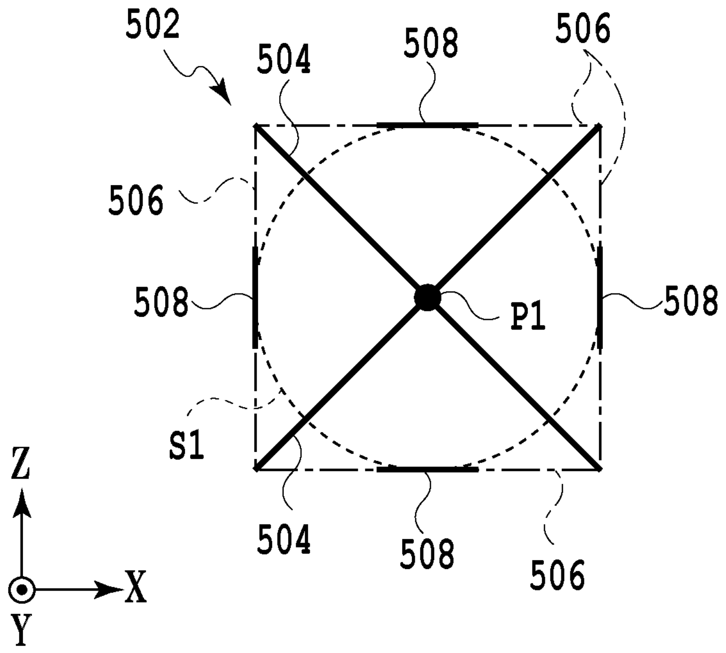
FIGS. 5A and 5B are diagrams showing an example of an insertion portion.
Figure 5B:
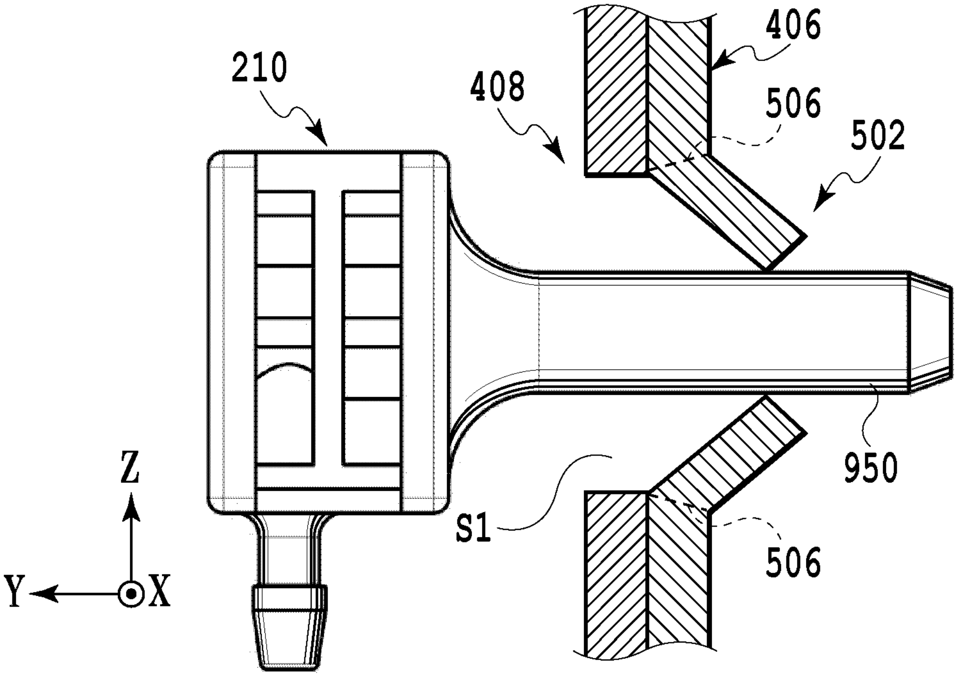

Next, the absorbent 406 loaded in the container portion 402 will be described. FIGS. 5A and 5B are diagrams showing an insertion portion provided in the absorbent 406 located within an opening area of the insertion port 408. FIG. 5A is a schematic configuration diagram of the insertion portion and FIG. 5B is a diagram showing a state where the needle portion 950 is inserted into the insertion portion. It should be noted that the X direction, Y direction, and Z direction in the figures indicate directions in a case when the waste ink tank 34 is stored in the storage portion 38. Incidentally, FIG. 5B shows that the absorbent 406 is located only in a partial area in the container portion 402 in the vicinity of the insertion port 408 in order to facilitate understanding. That is, the absorbent 406 near the insertion port 408 is not limited to the form shown in FIG. 5B.

The absorbent 406 is arranged inside the container portion 402 so as to be able to absorb waste ink discharged through the needle portion 950. The absorbent 406 is also formed with an insertion portion 502 through which the needle portion 950 can be inserted in a position corresponding to an opening area S1 of the insertion port 408, that is, in a position including a portion exposed from the insertion port 408.

The insertion portion 502 has a size large enough to cover the entire opening area S1 and is formed of a plurality of linear cuts 504 that intersect with each other in a center position P1 of the opening area S1. In the insertion portion 502, a linear cut 508 along a direction in which a buckling portion 506 extends is formed in the center position of each buckling portion 506 that buckles in a case when the needle portion 950 is inserted. Incidentally, in the insertion portion 502, the cut 508 is formed in a position in contact with the opening area S1 (the position shown in FIG. 5A) or is formed outside the opening area S1. For example, in a case when two cuts 504 are formed in a substantially cross shape in the insertion portion 502, the cut 508 is formed along the direction in which the buckling portion 506 extends in the center position of the buckling portion 506 connecting adjacent ends of the cut 504 (see FIG. 5A). Incidentally, the length of the cut 508 is shorter than the length of the buckling portion 506 in which the cut 508 is formed (a length between the adjacent ends of the cut 504).

As a result, in a case when the needle portion 950 is inserted from the insertion port 408, the needle portion 950 inserted from the vicinity of the center position P1 presses the insertion portion 502 in the −Y direction. As a result, a plurality of substantially triangular areas formed by the cuts 504 in the insertion portion 502 are deformed while contacting the needle portion 950 and bend in the −Y direction at the buckling portion 506 as shown in FIG. 5B. At this time, since the cut 508 is formed in the center position of the buckling portion 506, the insertion portion 502 can be easily bent in the −Y direction, and a load generated at the time of insertion of the needle portion 950 is reduced.

It should be noted that the insertion portion 502 does not have to be formed by the cuts 504 and 508 described above. That is, the insertion portion 502 may have any shape as long as there is formed a reduction portion capable of reducing a load to be generated on the needle portion 950 in a case when the needle portion 950 is inserted. In the above description, the cut 508 corresponds to the reduction portion.

Figure 6B:
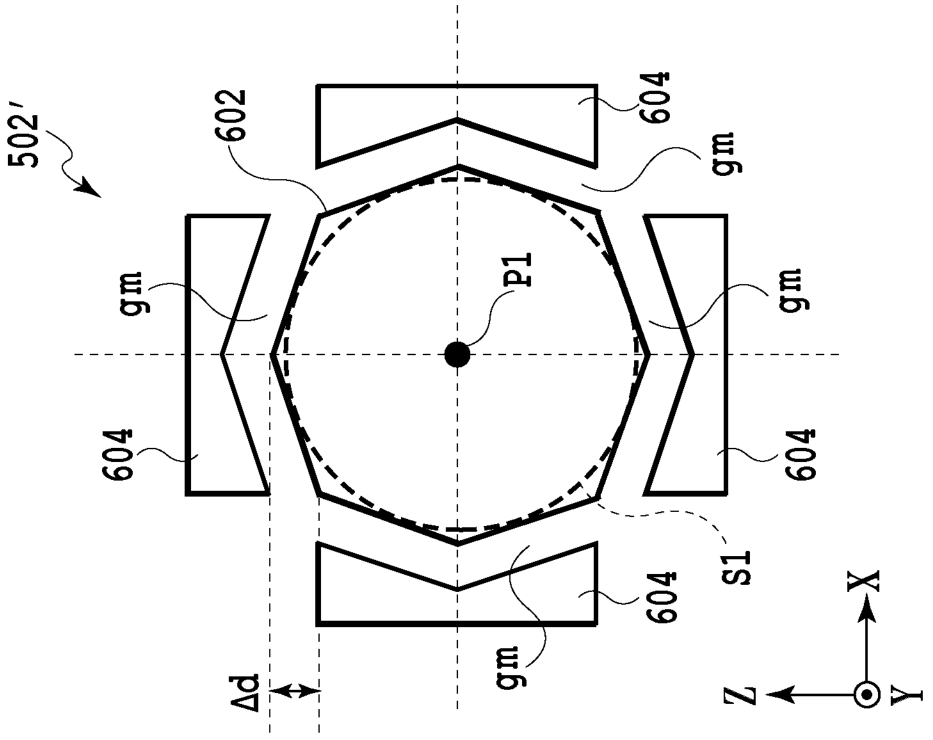
FIGS. 6A and 6B are diagrams showing another form of the insertion portion.
Figure 6A:
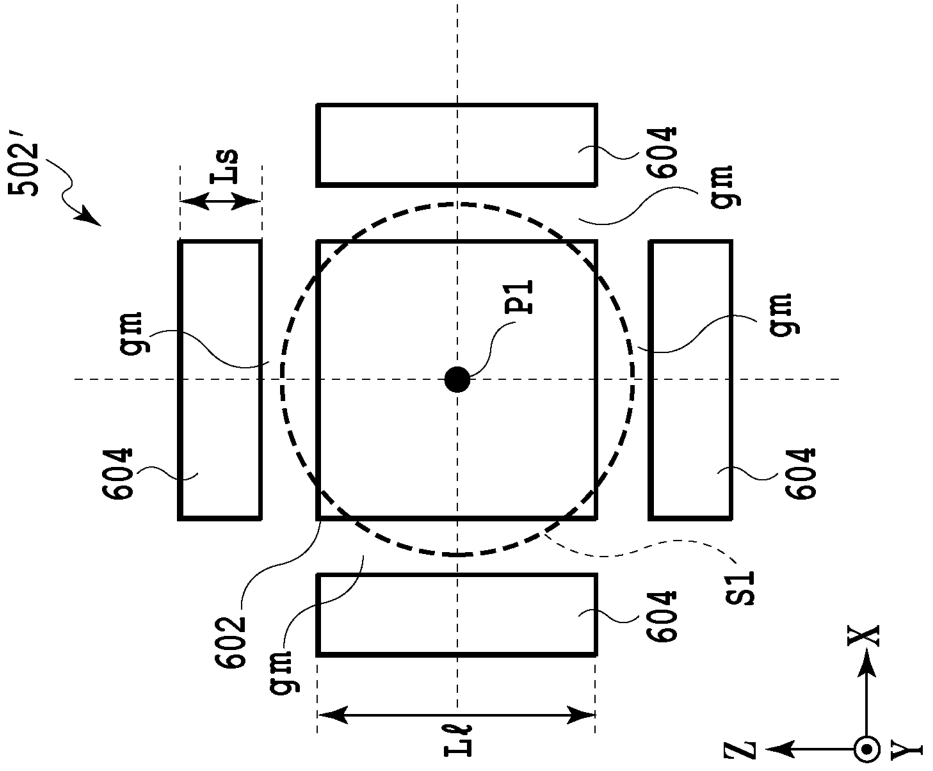

An insertion portion 502' in another form is, for example, formed of a substantially polygonal first opening 602 and substantially rectangular second openings 604 formed in positions corresponding to respective sides of the first opening 602, specifically, at predetermined distances from the respective sides (see FIGS. 6A and 6B). 6A and 6B are diagrams showing the insertion portion 502'. FIG. 6A is a schematic configuration diagram of the insertion portion 502' and FIG. 6B is a diagram showing the insertion portion 502' deformed due to the insertion of the needle portion 950. In 6A and 6B, as in 5A and 5B, the X direction, Y direction, and Z direction in the figures indicate directions in a case when the waste ink tank 34 is stored in the storage portion 38.

The first opening 602 is formed so that the center position thereof substantially coincides with the center position P1 of the opening area S1 and at least a portion of each side is located within the opening area S1. As shown in FIG. 6A, the first opening 602 has, for example, a substantially square shape.

The second opening 604 is provided on an extension of a direction in which the first opening 602 is deformed (hereafter also referred to as "deformation direction") in a case when the needle portion 950 is inserted into the insertion portion 502'. An interval between the second opening 604 and the first opening 602 is an interval such that a gap portion gm between the second opening 604 and the first opening 602 can be deformed as a whole in the deformation direction in a case when the needle portion 950 is inserted into the insertion portion 502'. The length Ls of a short side of the substantially rectangular second opening 604 is preferably equal to or greater than the deformation amount Δd of the gap portion gm in a case where the needle portion 950 is inserted into the insertion portion 502'. Further, the length L1 of a long side of the second opening 604 is, for example, substantially equal to the length of a corresponding side of the first opening 602. Incidentally, the shape of the second opening 604 is not limited to a substantially rectangular shape and may be any shape as long as the gap portion gm after deformation in a case when the needle portion 950 is inserted does not contact the inside of an opening in the second opening 604. That is, in the insertion portion 502', the length of the second opening 604 in a direction in which a corresponding side of the first opening 602 is deformed in a case when the needle portion 950 is inserted is preferably equal to or greater than the deformation amount Δd of the gap portion gm.

Such a configuration, in a case when the needle portion 950 is inserted from the insertion port 408, causes the needle portion 950 inserted from the vicinity of the center position P1 to press each side of the first opening 602 in a direction away from the center position P1 (the deformation direction described above). As a result, the gap portion gm is deformed in the direction away from the center position P1 while contacting the needle portion 950. Here, the second opening 604 is provided on an extension of the direction in which the gap portion gm is deformed, and the length of the second opening 604 in the direction of deformation, that is, the length of the short side Ls is equal to or greater than the deformation amount Δd of the gap portion. Thus, the deformation of the gap portion gm is absorbed by the second opening 604. As a result, the insertion portion 502' is easily deformed in a case when the needle portion 950 is inserted, and a load to be generated on the needle portion 950 at the time of insertion into the insertion port 408 is reduced. That is, in this case, the second opening 604 corresponds to the reduction portion that reduces a load to be generated on the needle portion 950 at the time of insertion.

Shielding Portion

Next, the shielding portion 414 will be described. The shielding portion 414 is configured to be movable between the shielding position and the open position as described above. Specifically, in a case when the waste ink tank 34 is not stored in the storage portion 38, the shielding portion 414 is located in the shielding position. In a case when the waste ink tank 34 is stored in the storage portion 38, the shielding portion 414 is moved from the shielding position to the open position by a frame portion 900 (to be described later) provided in the storage portion 38. Further, in a case when the waste ink tank 34 is pulled out from the storage portion 38, the shielding portion 414 is separated from the frame portion 900 and moves from the open position to the shielding position. The configurations of the shielding portion 414 (including a moving mechanism) and the frame portion 900 and the operation of the shielding portion 414 will be described below.

Figure 7:
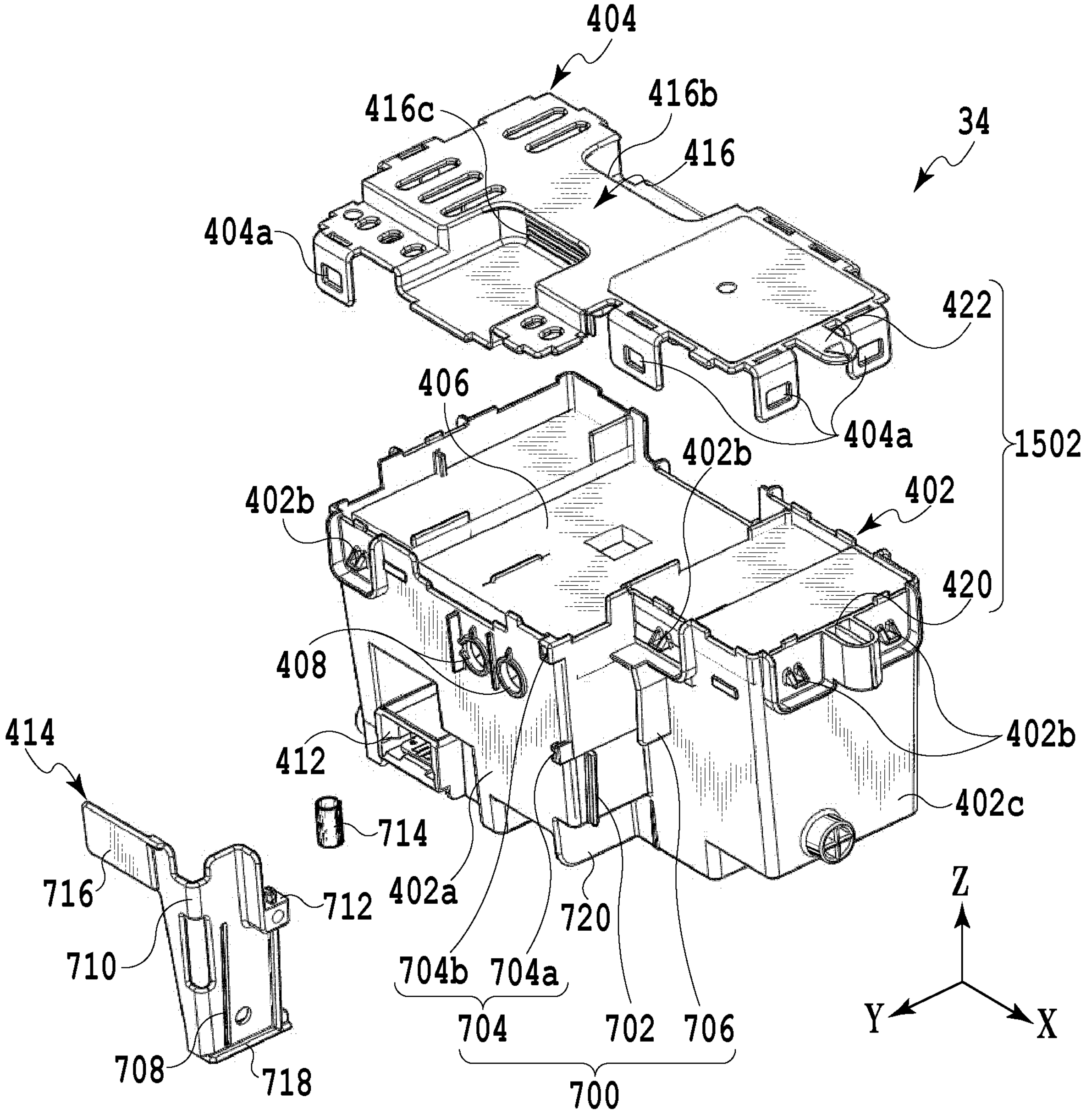
FIG. 7 is an exploded perspective view of the waste ink tank.
Figure 8A:
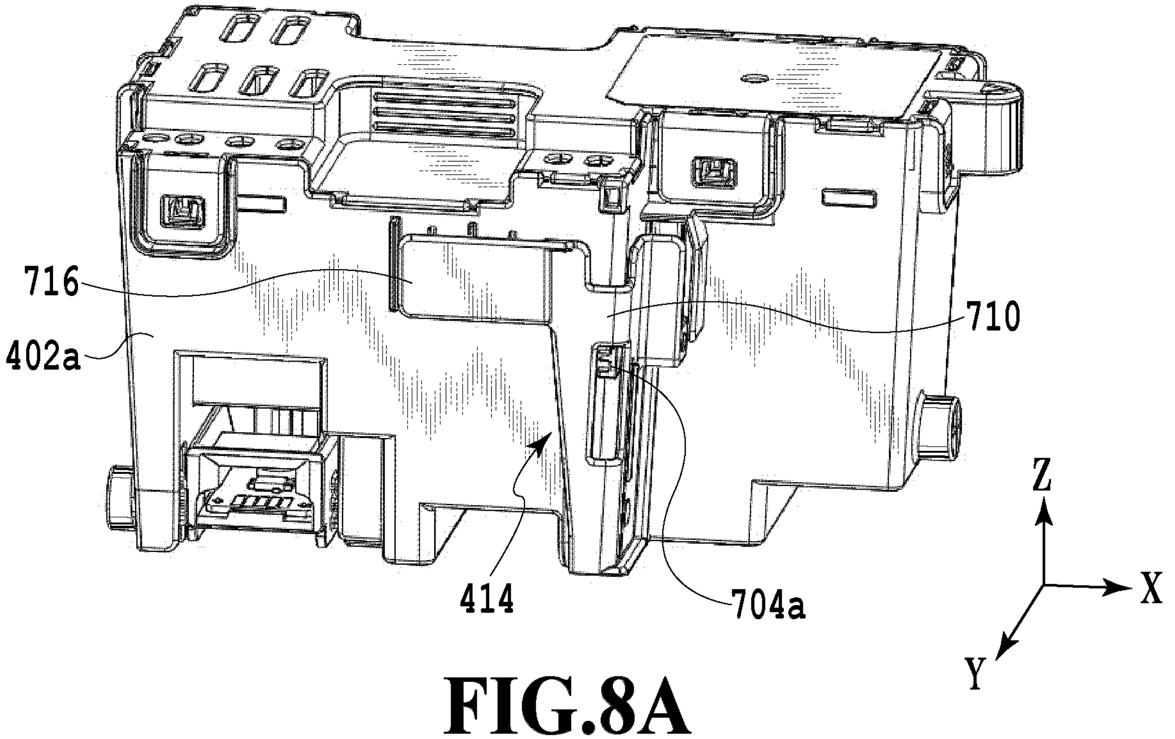
FIGS. 8A and 8B are diagrams showing the waste ink tank with a shielding portion located in a shielding position and an open position.
Figure 8B:
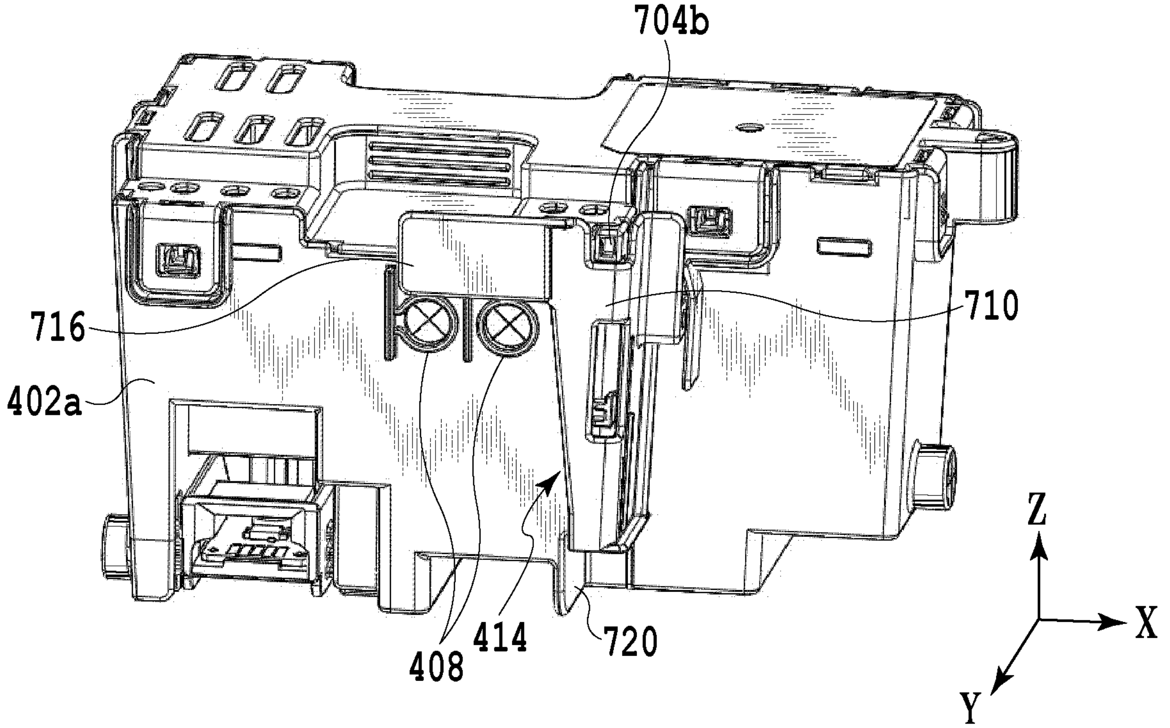

Configurations of the Shielding Portion and the Moving Mechanism of the Shielding Portion FIG. 7 is an exploded diagram of the waste ink tank 34. FIG. 8A is a perspective view of the waste ink tank 34 with the shielding portion 414 located in the shielding position and FIG. 8B is a perspective view of the waste ink tank 34 with the shielding portion 414 located in the open position.

A holding portion 700 capable of holding the shielding portion 414 movably in the Z direction is formed on the side surface 402*a* of the container portion 402. The shielding portion 414 is arranged on the side surface 402*a* of the container portion 402 while being held by the holding portion 700.

The holding portion 700 includes a rib 702 extending in the Z direction, a pair of convex portions 704 formed at an interval in the Z direction and protruding in the Y direction, and a spring receiving portion 706 that receives a spring 714 held between the holding portion 700 and the shielding portion 414. The shielding portion 414 includes a groove portion 708 that extends in the Z direction and can be fitted to the rib 702, an abutting portion 710 that is arranged between the pair of convex portions 704 and abuts against the pair of convex portions 704 at the time of the movement of the shielding portion 414 in the +Z directions, and a spring receiving portion 712 that receives the spring 714. The shielding portion 414 also includes a shielding member 716 that shields the insertion port 408 and an engagement portion 718 that engages the frame portion 900 in the case of storing the waste ink tank 34 in the storage portion 38.

In a case when the shielding portion 414 is held by the holding portion 700, the spring 714 is held by the spring receiving portion 706 and the spring receiving portion 712. The spring 714 is arranged in the spring receiving portion 706 and the spring receiving portion 712 so as to bias the shielding portion 414 in the −Z direction (predetermined direction). Further, the groove portion 708 is fitted to the rib 702 with the abutting portion 710 located between the pair of convex portions 704.

The abutting portion 710 between the pair of convex portions 704 restricts movement of the shielding portion 414 in the +Z directions beyond a predetermined range including the shielding position and the open position. Specifically, the shielding portion 414 is always biased in the −Z direction by the spring 714 and thus is located in the shielding position where the shielding member 716 shields the insertion port 408 (see FIG. 8A) unless a force in the Z direction acts on the shielding portion 414. In this shielding position, the abutting portion 710 contacts one convex portion 704*a* located on one side in the Z direction of the pair of convex portions 704, so that the movement of the shielding portion 414 in the −Z direction beyond the shielding position is restricted. On the other hand, in a case when a force in the Z direction is applied to the shielding portion 414, the shielding portion 414 moves in the Z direction against the biasing force of the spring 714 in the −Z direction and is located in the open position where the shielding of the insertion port 408 by the shielding member 716 is released (see FIG. 8B). In this open position, the abutting portion 710 contacts the other convex portion 704*b* located on the other side in the Z direction of the pair of convex portions 704, so that the movement of the shielding portion 414 in the Z direction beyond the open position is restricted. As described above, in the present embodiment, the pair of convex portions 704 functions as a restriction member that restricts the movement of the shielding portion 414 in the −Z direction beyond the shielding position and also restricts the movement of the shielding portion 414 in the Z direction beyond the open position.

Further, movement in the Y direction is restricted by fitting the rib 702 into the groove portion 708. It should be noted that the shielding portion 414 is provided in a portion where a step in the Y direction of the container portion 402 is formed, and movement in the X direction is restricted by the shape of the step, the pair of convex portions 704, the abutting portion 710, and the like. The engagement relationship between the shielding portion 414 and the holding portion 700 is not limited to the configuration described above, and various publicly-known techniques can be used.

Configuration of the Frame Portion and the Operation of the Shielding Portion at the Time of Mounting on the Frame Portion Next, descriptions will be given of the configuration of the frame portion provided in the storage portion 38 and the operation of the shielding portion 414 in a case when the waste ink tank 34 is mounted on the frame portion. The frame portion has the function of guiding the waste ink tank 34 moved in the −Z direction, inserted into the storage portion 38, and located in the insertion position to a connection position where the waste ink tank 34 is connected to the needle portion 950 of the connection portion 210 and the function of moving the shielding portion 414 from the shielding position to the open position.

Configuration of the Frame Portion

Figure 9:
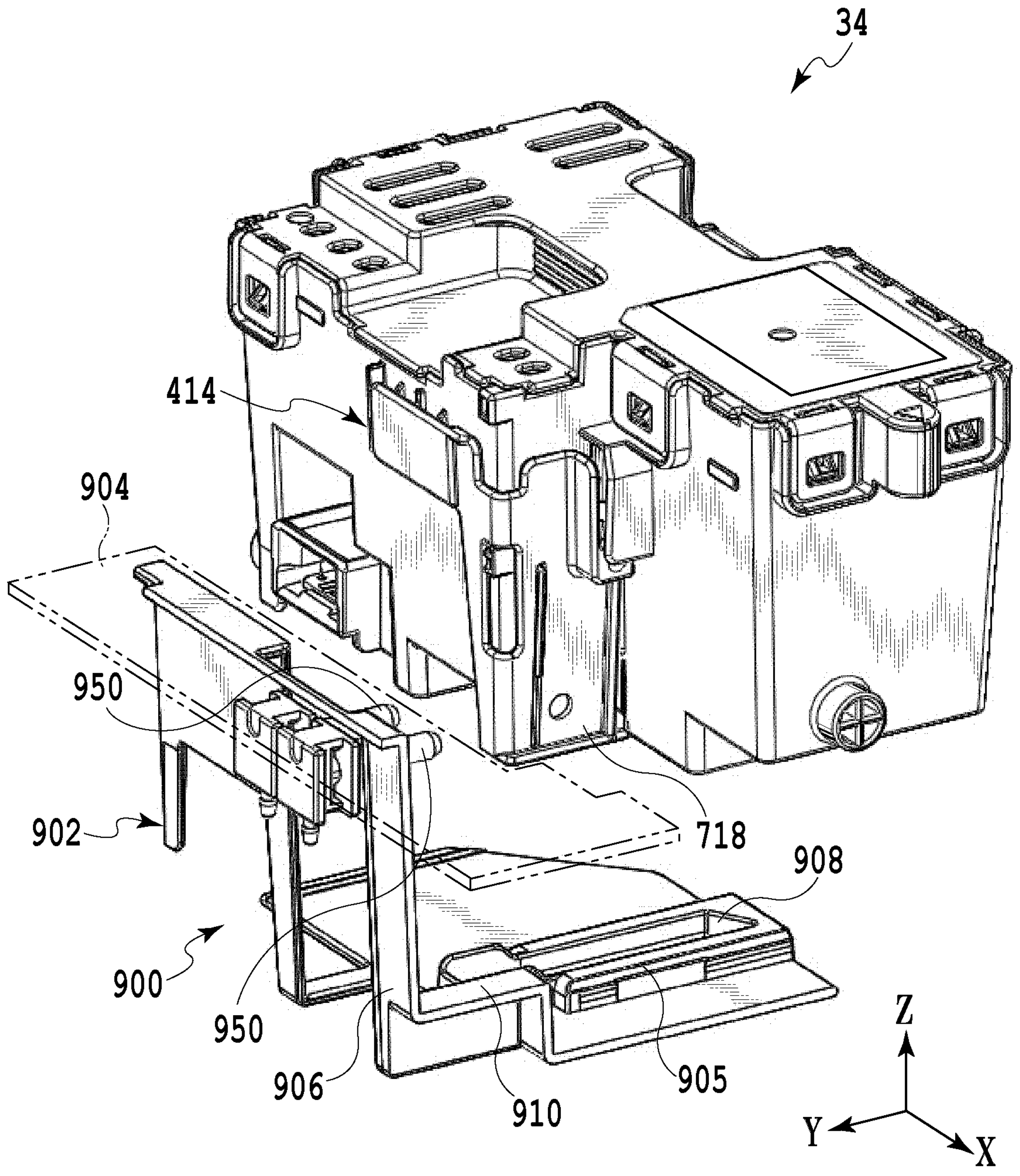
FIG. 9 is a perspective configuration diagram of a frame portion.

FIG. 9 is a perspective configuration diagram of the frame portion 900 provided in the storage portion 38. The frame portion 900 includes a main body portion 902 to and from which the waste ink tank 34 can be attached and detached and a cover 904 provided on the other side in the Z direction of the main body portion 902. Incidentally, in FIG. 9, the shape of the cover 904 is shown in a simplified manner to facilitate understanding.

The main body portion 902 includes a guide portion 905 that extends in the Y direction and can guide the movement of the waste ink tank 34 between the insertion position and the connection position and an erected portion 906 that is erected on the other side in the Y direction of the guide portion 905. The guide portion 905 includes a guide groove 908 into which a guide 720 (see FIG. 7) provided in the waste ink tank 34 is inserted and an engagement portion 910 that engages the shielding portion 414 between the insertion position and the connection position of the waste ink tank 34. In the erected portion 906, the connection portion 210 is held so that the needle portion 950 is properly inserted into the insertion port 408 in a case when the waste ink tank 34 with the shielding portion 414 being in the open position moves to the connection position.

The cover 904 is configured to cover the upper side of the connection portion 210 arranged in the main body portion 902. That is, the cover 904 covers the connection portion of the connection portion 210 at the erected portion 906 and the upper side of the exposed needle portion 950. Incidentally, the cover 904 may be formed integrally with the main body portion 902 or may be provided separately from the main body portion 902. In the case of being formed separately, the cover 904 may, for example, be fixedly connected to the cover member 36 or may be connected revolvably about an axis parallel to the X direction. Incidentally, In FIGS. 1A and 1B, an illustration of the cover 904 is omitted.

Operation of the Shielding Portion at the Time of Mounting on the Frame Portion

Figure 10B:
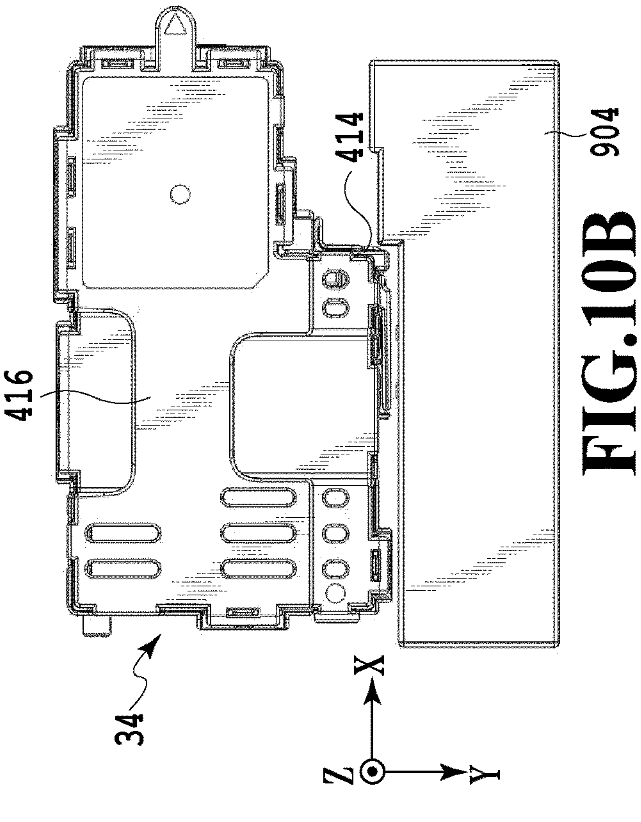
FIGS. 10A to 10C are diagrams showing a positional relationship between the waste ink tank and the frame portion in an insertion position.
Figure 10C:
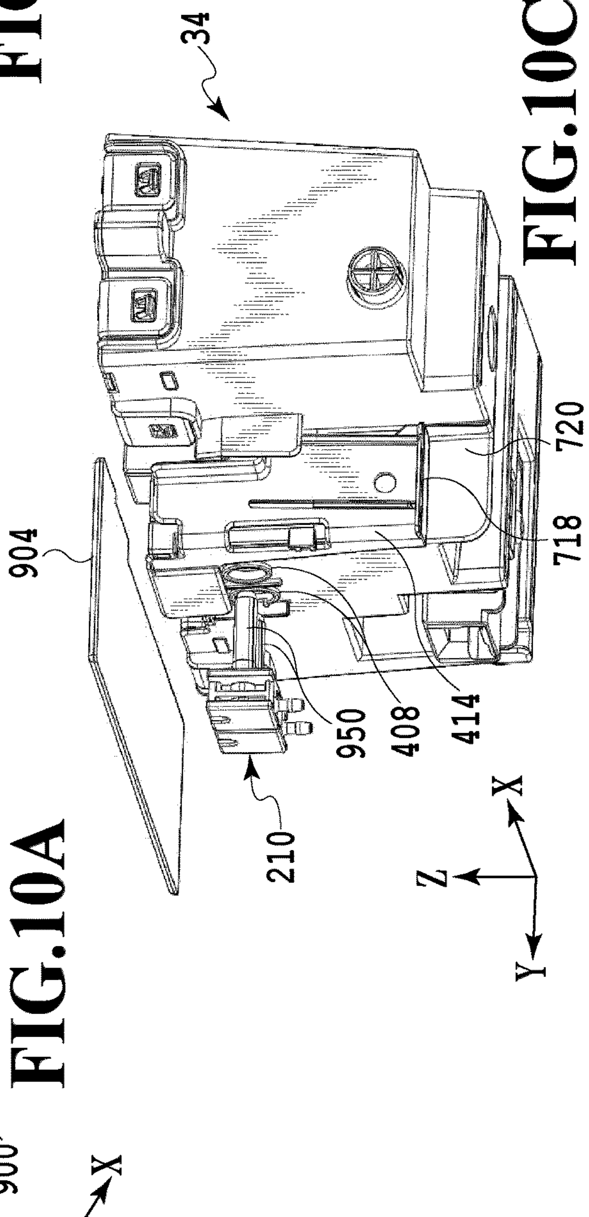
Figure 10A:
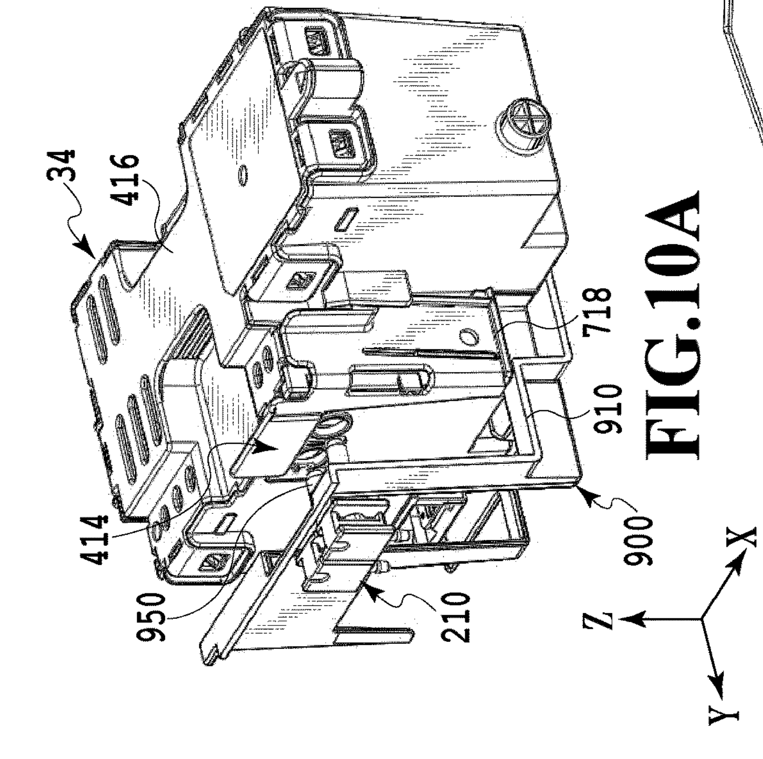
Figure 11B:
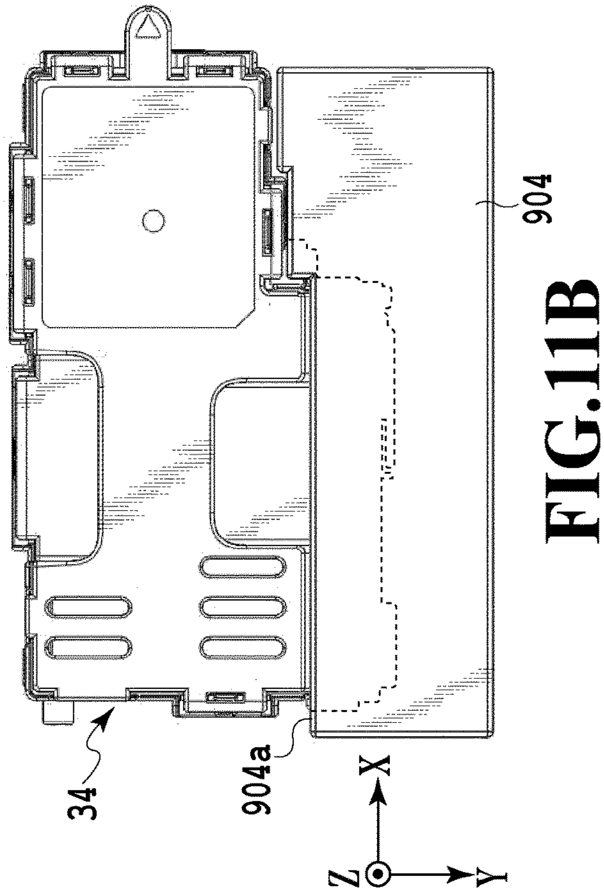
FIGS. 11A to 11C are diagrams showing a positional relationship between the waste ink tank and the frame portion in a storage position.
Figure 11C:
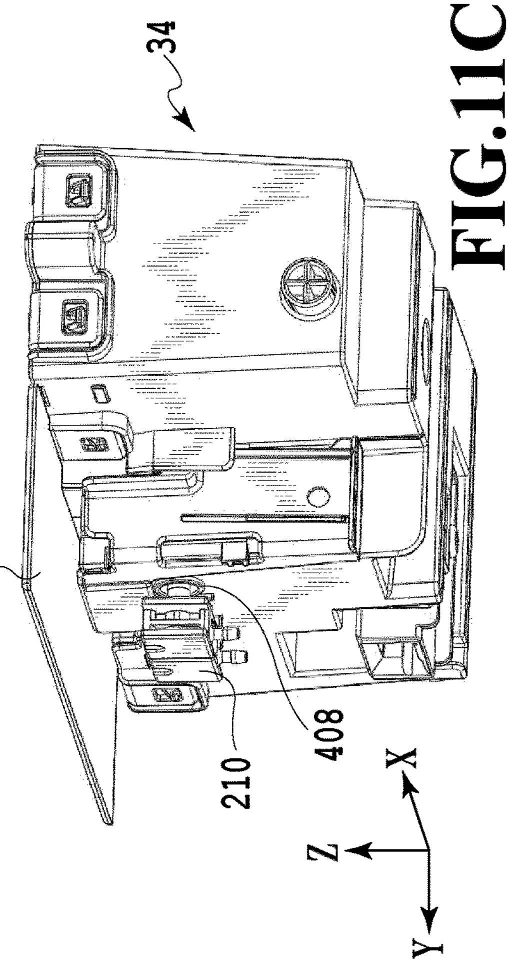
Figure 11A:
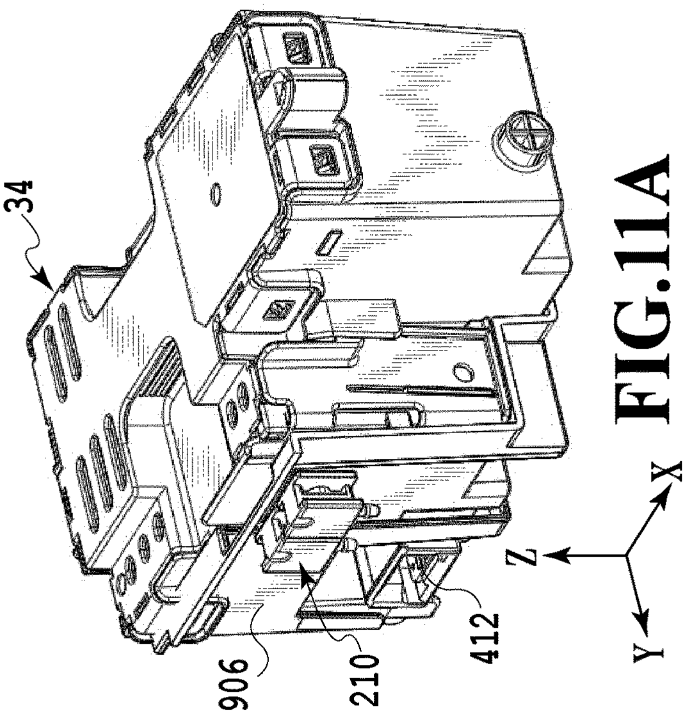

FIGS. 10A to 10C are diagrams showing the waste ink tank 34 and the frame portion 900 in the insertion position. FIG. 10A is a perspective view seen from above, FIG. 10B is a plan view, and FIG. 10C is a perspective view seen from below. FIGS. 11A to 11C are diagrams showing the waste ink tank 34 and the frame portion 900 in the connection position. FIG. 11A is a perspective view seen from above, FIG. 11B is a plan view, and FIG. 11C is a perspective view seen from below. Incidentally, in FIG. 10A and FIG. 11A, the cover 904 is omitted to facilitate understanding. Additionally, FIGS. 10B and 10C and FIGS. 11B and 11C show the shape of the cover 904 in a simplified manner to facilitate understanding. Further, in FIG. 10C and FIG. 11C, the main body portion 902 is omitted to facilitate understanding.

In a case when the waste ink tank 34 is inserted into the storage portion 38 from the opening 40 while moving in the −Z direction and is arranged in the insertion position in the storage portion 38, the positional relationship between the frame portion 900 and the waste ink tank 34 provided in the storage portion 38 is as shown in FIG. 10A.

Specifically, at the time of arrangement in the insertion position, an operator first grips the gripping portion 416 with the operator's fingers, inserts the waste ink tank 34 into the storage portion 38 from the opening 40 in the −Z direction, and fits the guide 720 of the waste ink tank 34 into the guide groove 908 of the frame portion 900. At this time, the engagement portion 718 of the shielding portion 414 engages the engagement portion 910 of the frame portion 900. The operator then removes the operator's fingers from the gripping portion 416. Here, the biasing force of the spring 714 is less than a force in the −Z direction generated under the weight of the waste ink tank 34. Thus, in a case when the fingers are released from the gripping portion 416, the shielding portion 414 maintains the position thereof in the Z direction, while the container portion 402 moves in the −Z direction. That is, the shielding portion 414 moves in the Z direction relatively with respect to the container portion 402. As a result, the shielding portion 414 is located in the open position and the insertion port 408 is opened. Although a case when the shielding portion 414 is located in the open position under the weight of the waste ink tank 34 has been described, the present invention is not limited to this, and an operator may locate the shielding portion 414 in the open position by pressing the waste ink tank 34 in the −Z direction.

In the insertion position, the waste ink tank 34 is separated from the cover 904 in the Y direction (see FIG. 10B). In the insertion position, the needle portion 950 is separated from the insertion port 408 and is not inserted (see FIG. 10C).

After the waste ink tank 34 is located in the insertion position, an operator moves the waste ink tank 34 in the Y direction. As a result, the waste ink tank 34 is moved in the Y direction while being guided by the guide portion 905, and the needle portion 950 of the connection portion 210 fixed to the erected portion 906 is inserted into the insertion port 408 (see FIG. 11A). The waste ink tank 34 is then moved and fixed to a position where the needle portion 950 is properly inserted into the insertion port 408, that is, the connection position where waste ink discharged from the needle portion 950 does not leak from the insertion port 408. A fixing mechanism for the waste ink tank 34 will be described later. The connection terminal 412 of the waste ink tank 34 is connected to the connection terminal provided in the storage portion 38 in the connection position. As a result, the MPU 302 detects that a new waste ink tank 34 has been mounted and stores the amount of waste ink contained in the newly attached waste ink tank 34.

In the connection position, the waste ink tank 34 is adjacent to the cover 904 in the Y direction (see FIG. 11B). In the connection position, the waste ink tank 34 has a partial area on the other side in the Y direction where the insertion port 408 and the shielding portion 414 are located (see the broken line portion in FIG. 11B), the upper side of the partial area being covered with the cover 904. That is, the cover 904 is provided so as to overlap a portion of the waste ink tank 34 in the connection position in the Y direction. Further, the shape of the side 904*a* of the cover 904 on one side in the Y direction adjacent to the waste ink tank 34 corresponds to the shape of the adjacent waste ink tank 34 in the connection position. In the waste ink tank 34 in the connection position, for example, the upper surface of the lid portion 404 and the cover member 36 coincide with each other in the Z direction, or the upper surface of the lid portion 404 is located closer to one side (lower side) in the Z direction than to the cover member 36 by a certain amount.

In the case of pulling out the waste ink tank 34 from the storage portion 38, the above procedure is performed reversely. Specifically, an operator first grips the gripping portion 416 and moves the waste ink tank 34 in the −Y direction. As a result, the waste ink tank 34 moves from the connection position to the insertion position. At this time, although the needle portion 950 is pulled out from the insertion port 408, the insertion portion 502 of the absorbent 406 is located in the opening area S1 of the insertion port 408, and the needle portion 950 is pulled out while contacting the insertion portion 502. Thus, ink is less likely to leak out of the insertion port 408.

After that, the waste ink tank 34 is moved in the Z direction and is pulled out from the storage portion 38. After the waste ink tank 34 is moved in the Z direction from the insertion position, the engagement portion 718 of the shielding portion 414 is separated from the engagement portion 910 of the frame portion 900, so that the biasing force of the spring 714 moves the shielding portion 414 in the −Z direction relatively with respect to the container portion 402.

As a result, the shielding portion 414 moves from the open position to the shielding position. Accordingly, in a case when the waste ink tank 34 is pulled out from the storage portion 38, the insertion port 408 is shielded by the shielding portion 414, so that the operator cannot easily contact the insertion port 408 of the waste ink tank 34 pulled out, which suppresses adhesion of ink to the operator.

Further, pulling out the waste ink tank 34 from the storage portion 38 brings about a state where the needle portion 950 is exposed to the outside. However, since the cover 904 covers the upper side of the connection portion 210 including the needle portion 950, an operator cannot easily contact the needle portion 950 to which waste ink is adhered, which suppresses adhesion of ink to the operator.

As described above, the waste ink tank 34 includes the shielding portion 414 that shields the insertion port 408 into which the needle portion 950 is inserted in a case when the waste ink tank 34 is pulled out from the storage portion 38 and opens the insertion port 408 in a case when the waste ink tank 34 is stored in the storage portion 38. Further, the storage portion 38 includes the frame portion 900 that moves the shielding portion 414 in the insertion position to open the insertion port 408 and is capable of guiding the waste ink tank 34 to the connection position while maintaining that state and where the needle portion 950 is properly inserted into the insertion port 408 in the connection position. The frame portion 900 is further provided with the cover 904 that covers the upper side of the connection portion 210 including the needle portion 950.

As a result, in the case of pulling out the waste ink tank 34 from the storage portion 38, the insertion port 408 is shielded by the shielding portion 414 and cannot be easily contacted, which suppresses adhesion of ink to an operator. Further, the needle portion 950 is exposed in the storage portion 38 after the waste ink tank 34 is pulled out. However, since the cover 904 covers the upper side of the needle portion 950, the needle portion 950 cannot be easily contacted, which suppresses adhesion of ink to an operator.

Gripping Portion

Figure 12:
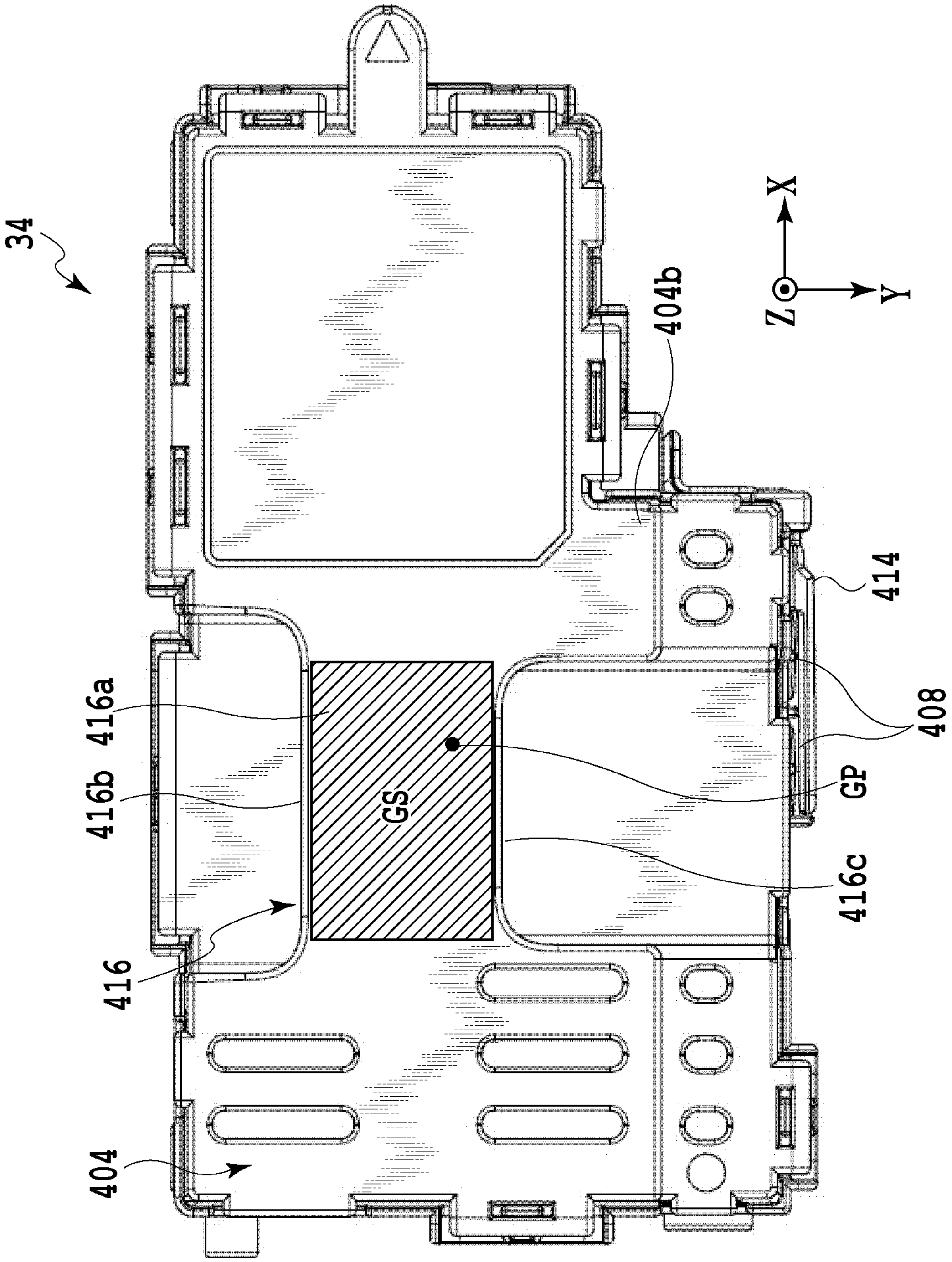
FIG. 12 is a plan view of the waste ink tank showing an example of a gripping portion.

Next, the gripping portion 416 will be described. FIG. 12 is a plan view of the waste ink tank 34 for explaining a position where the gripping portion 416 is installed.

The gripping portion 416 is formed by cutting out a portion of one side and the other side in the Y direction of the lid portion 404. An upper surface 416*a* of the gripping portion 416 and an upper surface 404*b* of the lid portion 404 may be formed on the same plane, or may be formed on different planes such as planes having a step. The gripping portion 416 includes a gripping surface 416*b* formed substantially parallel to an XZ plane and a gripping surface 416*c* formed opposite to the gripping surface 416*b* on the other side in the Y-direction of the gripping surface 416*b*. Thus, in a case when the waste ink tank 34 is stored in the storage portion 38, the gripping surface 416*b* is located closer to the back side (one side in the Y direction) of the apparatus than to the gripping surface 416*c*. As a result, in replacing the waste ink tank 34, the gripping portion 416 is gripped by locating a thumb on a gripping surface 416*c* side of the gripping portion 416 and locating a plurality of fingers such as an index finger and a middle finger on a gripping surface 416*b* side. Thus, for example, the length of the gripping surface 416*b* in the X direction is formed so as to be longer than the length of the gripping surface 416*c* in the X direction.

Further, the gripping portion 416 is designed so that a gripping area GS is located above a center position of gravity GP (on the other side in the Z direction) in a case when the waste ink tank 34 is filled with waste ink and needs to be replaced. The gripping area GS is an area sandwiched between the gripping surface 416*b* and the gripping surface 416*c*. Since the waste ink tank 34 is moved by gripping the gripping surface 416*b* and the gripping surface 416*c* with an operator's fingers as described above, the upper surface 416*a* of the gripping portion 416 and the operator's palm normally face each other during movement. Accordingly, at the time of replacing of the waste ink tank 34, the center position of gravity GP of the waste ink tank 34 whose container portion 402 is filled with waste ink is located right below the palm of the operator who grips the gripping portion 416. As a result, the operator is less likely to feel unevenness in the weight of the waste ink tank 34 filled with waste ink and can stably carry out a replacement operation.

Further, the gripping portion 416 is formed in a position where at least a portion of the gripping portion 416 overlaps the insertion port 408 in the X direction. In a case when an operator grips a position away from the center position of gravity GP in the X direction in the gripping portion 416, there is a possibility that a force to rotate about an axis substantially parallel to the Y direction in the gripped position is generated and that the waste ink tank 34 is inclined. In a case when the waste ink tank 34 is inclined, waste ink moves toward the end located on one side (lower side) in the Z direction of the waste ink tank 34. However, in the present embodiment, the insertion port 408 is formed on the side surface 402*a* in a position overlapping the gripping portion 416 in the X direction. Thus, even in a case when the waste ink moves due to the inclination of the waste ink tank 34, ink is less likely to leak from the insertion port 408.

Figure 13A:
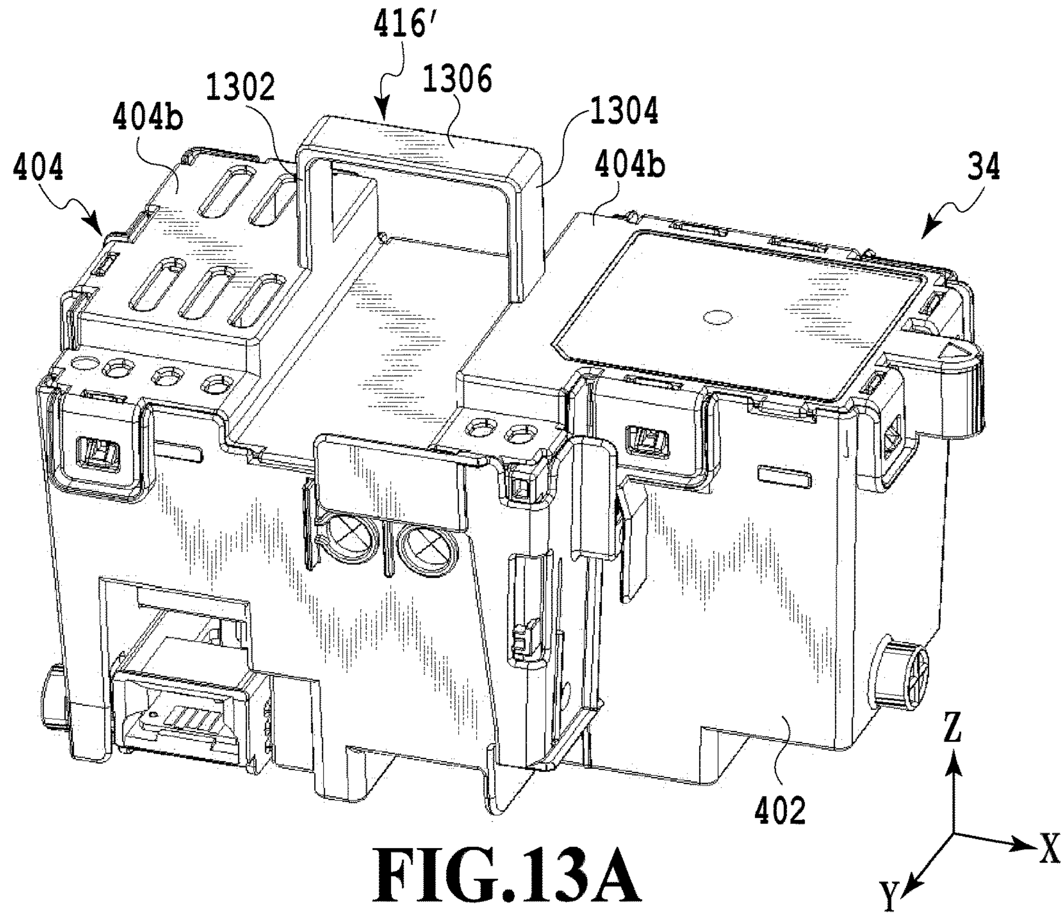
FIGS. 13A and 13B are diagrams showing another form of the gripping portion.
Figure 13B:
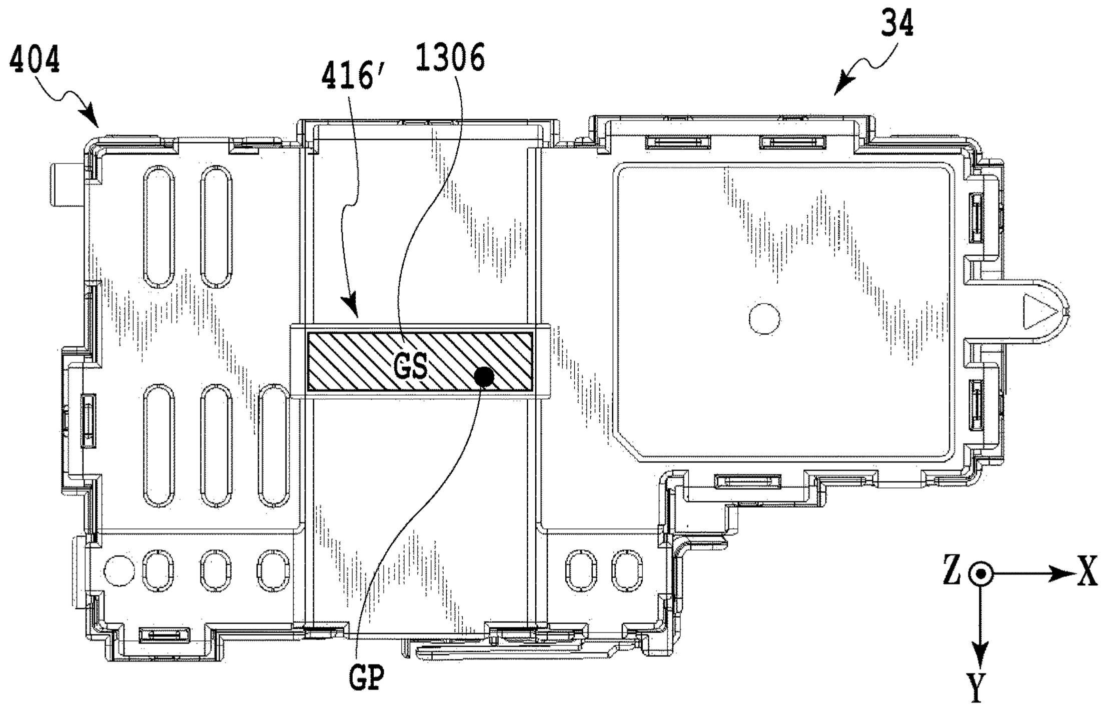

It should be noted that the gripping portion 416 is not limited to one configured to be gripped so that the gripping surfaces 416*b* and 416*c* are pinched. That is, as shown in FIGS. 13A and 13B, the gripping portion may be configured to be able to be gripped so as to be grasped by providing space between the surfaces of the lid portion 404. FIGS. 13A and 13B are configuration diagrams showing modification examples of the gripping portion. FIG. 13A is a perspective view and FIG. 13B is a plan view.

Specifically, the gripping portion 416' as a modification example is formed in a handle shape, and includes, on the upper surface 404*b* of the lid portion 404, erected portions 1302, 1304 arranged at an interval in the X direction and a connection portion 1306 that connects the erected portion 1302 and the erected portion 1304 at the upper ends thereof. An operator grips the gripping portion 416' by putting the operator's fingers through space formed between the gripping portion 416' and the lid portion 404 and grasping the connection portion 1306. The connection portion 1306 is formed to be located above the center position of gravity GP of the waste ink tank 34 filled with waste ink. Additionally, the gripping portion 416' is formed in a position where at least a portion thereof overlaps the insertion port 408 in the X direction. As a result, the gripping portion 416' produces the same advantageous result as that produced by the gripping portion 416. Incidentally, the gripping portion 416' is designed so as not to protrude from the cover member 36 in the Z direction, for example, in a case where the waste ink tank 34 is stored in the storage portion 38.

As described above, in the present embodiment, the gripping portion 416 (416') of the waste ink tank 34 is located above the center position of gravity GP of the waste ink tank 34 filled with waste ink. Additionally, the gripping portion 416 (416') is formed in a position where at least a portion thereof overlaps the insertion port 408 in the X direction. As a result, it is possible to stably replace the waste ink tank 34 filled with waste ink. Further, even in a case when a position away from the center position of gravity GP is gripped in the gripping portion and the waste ink tank 34 is inclined, ink is less likely to leak from the insertion port 408.

Storage Portion of the Waste Ink Tank

Figure 14:
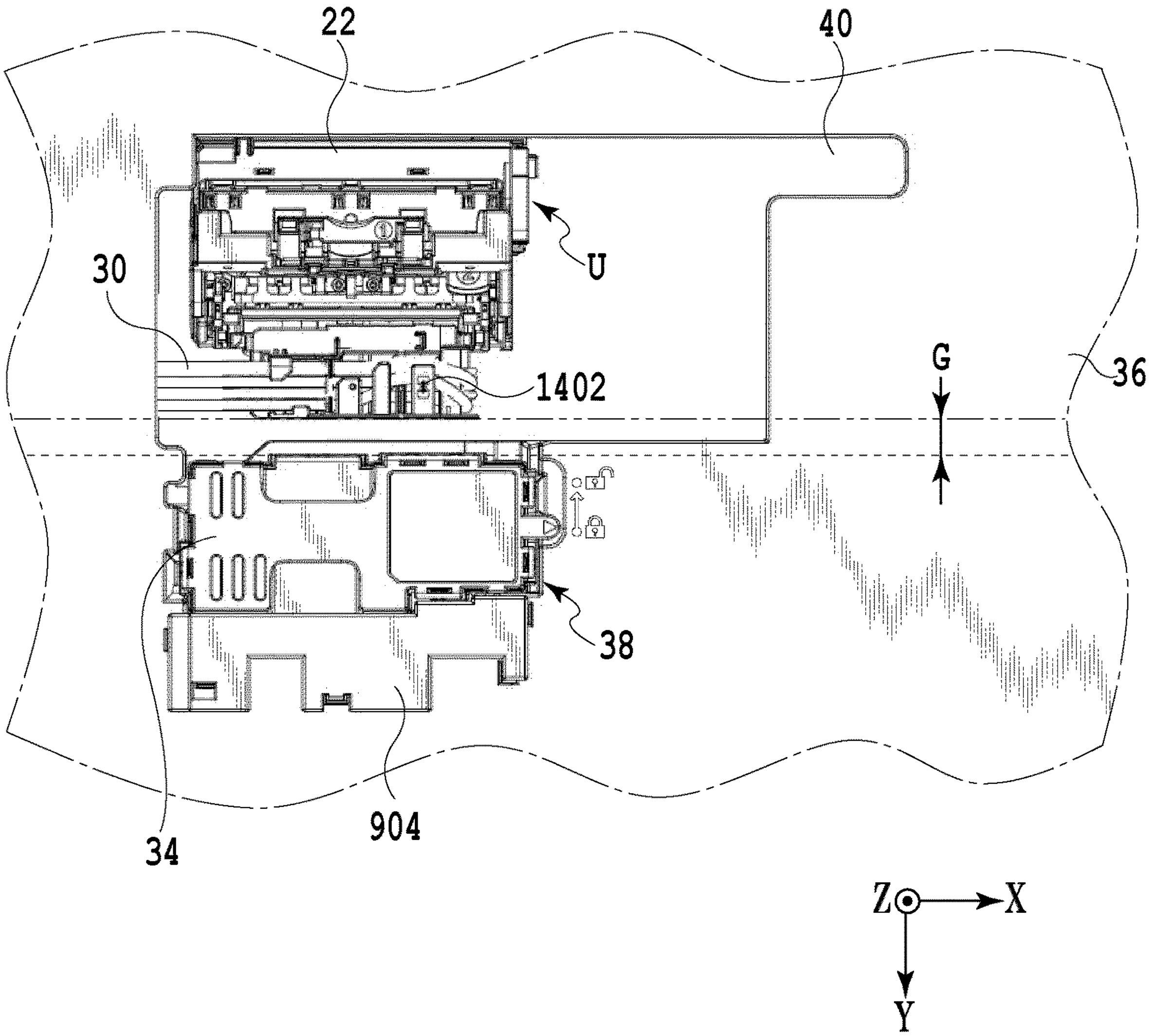
FIG. 14 is a diagram showing a state where a printing unit and the waste ink tank are exposed from an opening.
Figure 15A:
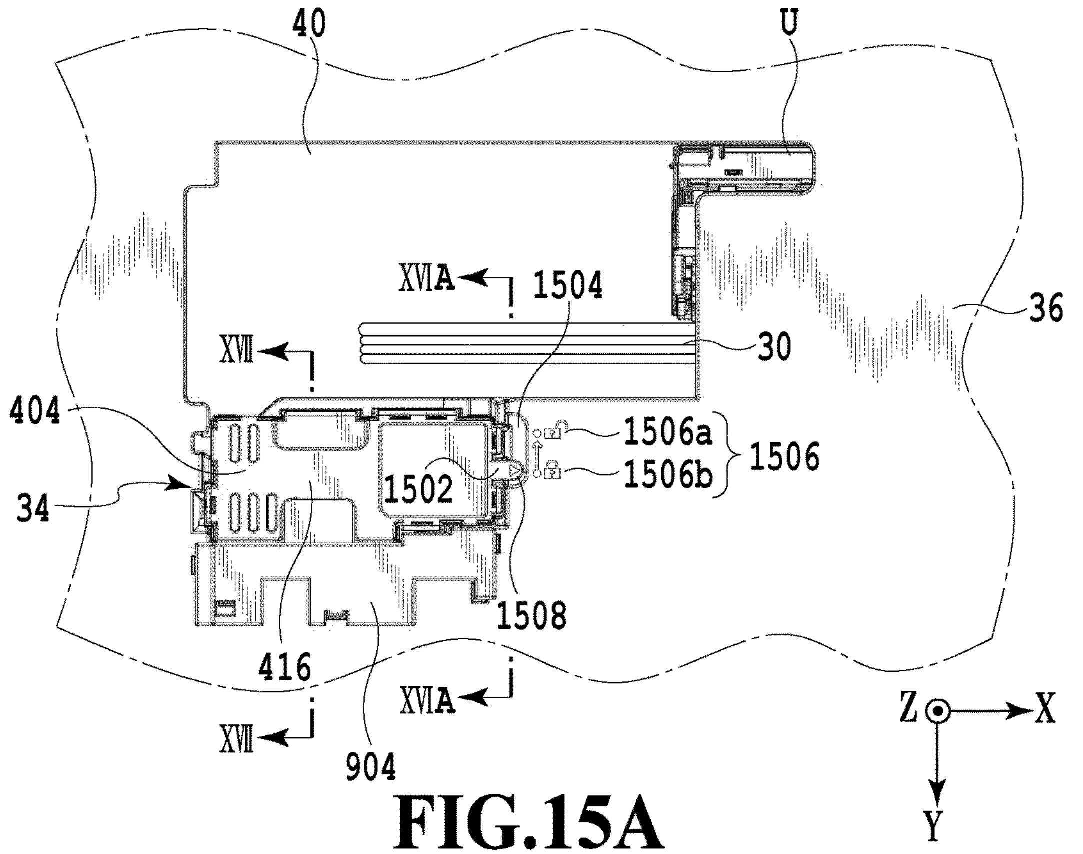
FIGS. 15A and 15B are diagrams for explaining replacement of the waste ink tank.
Figure 15B:
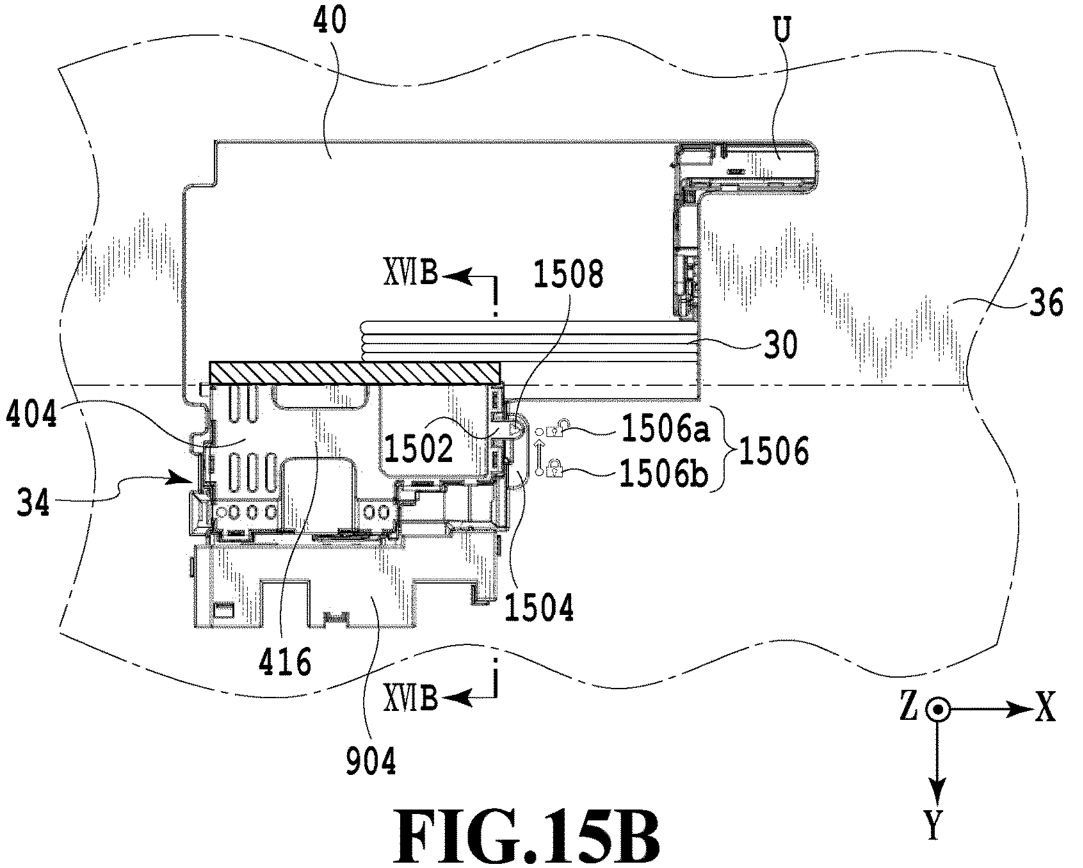
Figure 16A:
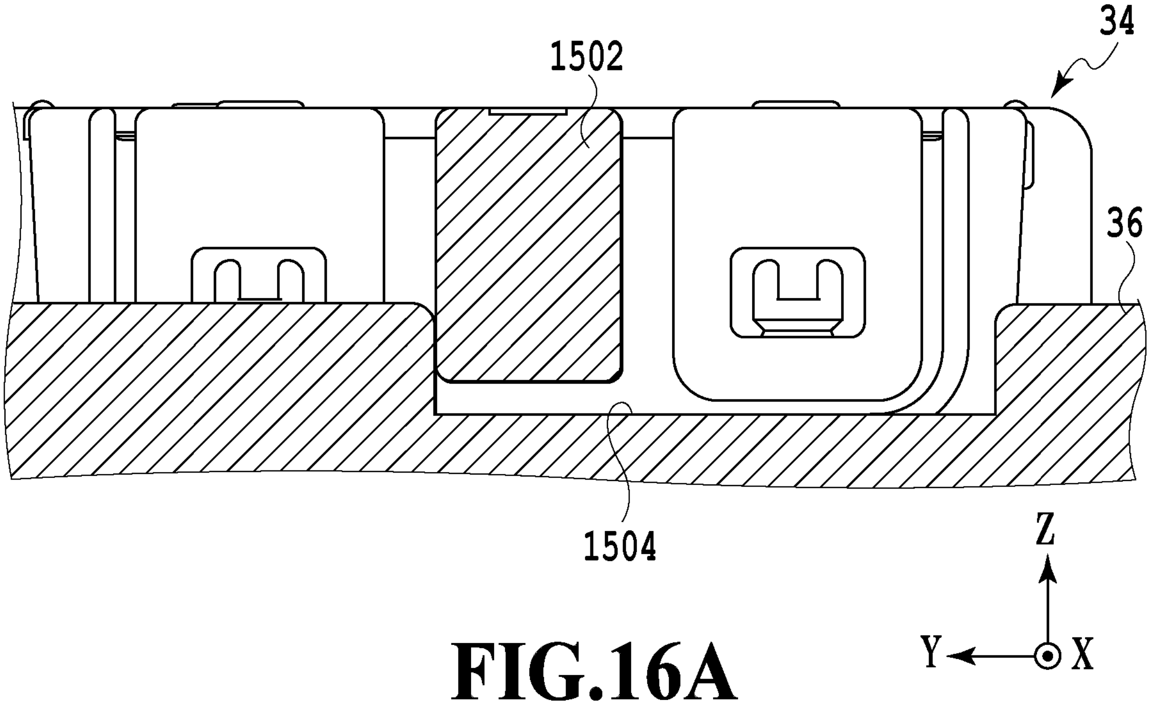
FIGS. 16A and 16B are diagrams for explaining restriction, by a convex portion, of movement of the waste ink tank.
Figure 16B:
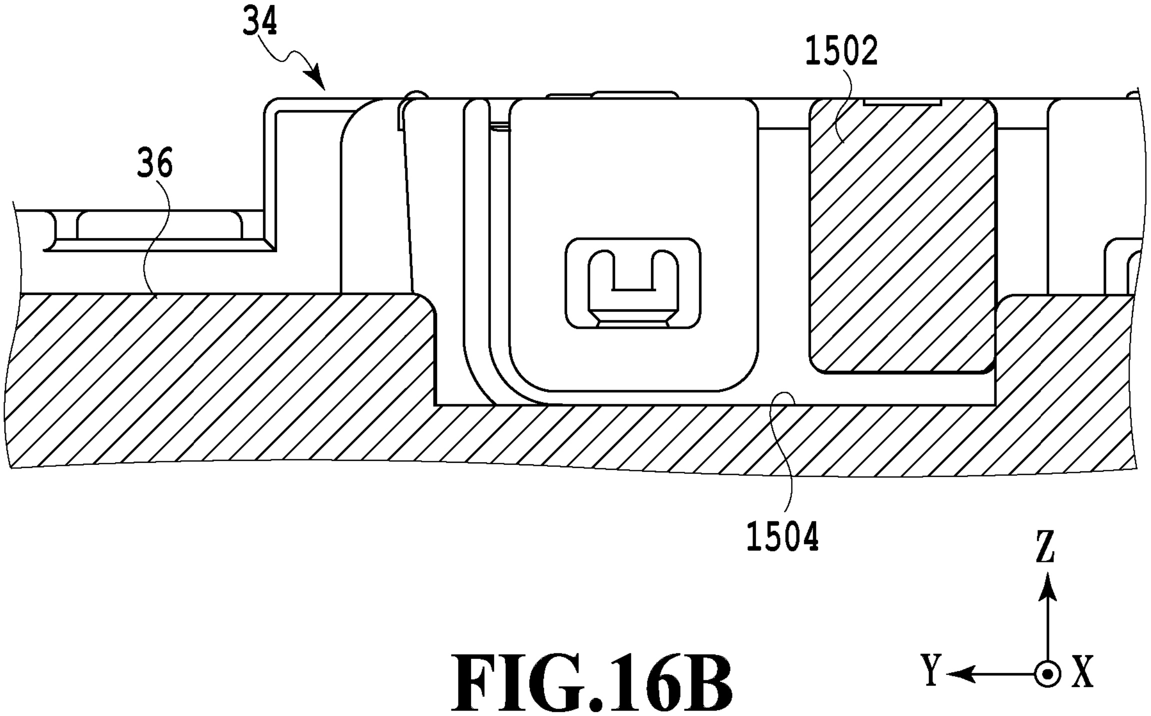
Figure 17:
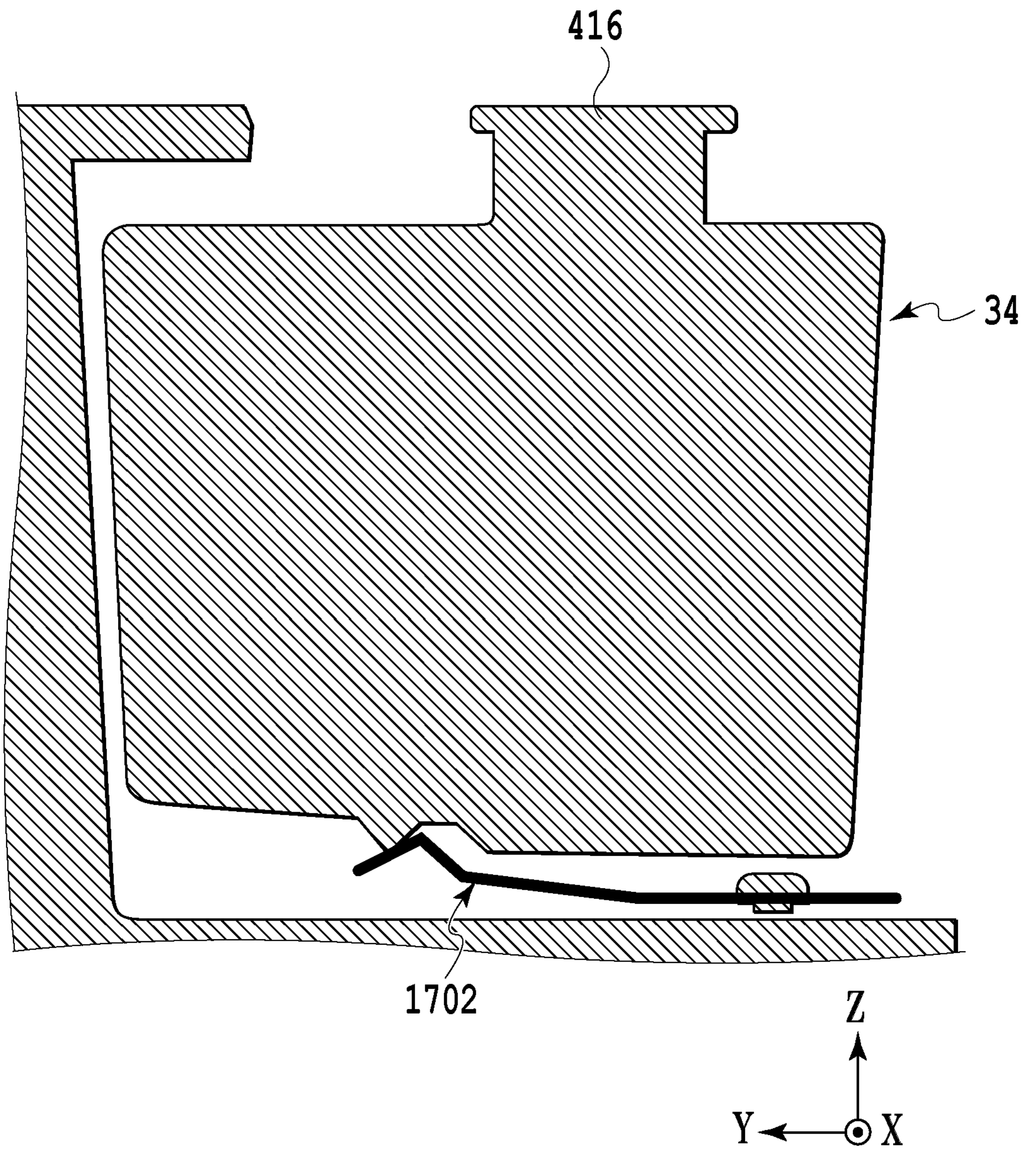
FIG. 17 is a diagram showing a fixing mechanism for the waste ink tank.

Next, the storage portion 38 will be described. FIG. 14 is a plan view of the waste ink tank 34 and the print head 22 in the opening 40. FIGS. 15A and 15B are diagrams for explaining a procedure for pulling out the waste ink tank 34 from the storage portion 38. FIG. 15A shows a state where the waste ink tank 34 is in the connection position and FIG. 15B shows a state where the waste ink tank 34 is in the insertion position. FIG. 16A is a cross-sectional view of the vicinity of a restriction portion taken along line XVIA-XVIA in FIG. 15A. FIG. 16B is a cross-sectional view of the vicinity of the restriction portion taken along line XVIB-XVIB in FIG. 15B. FIG. 17 is a diagram schematically showing a cross section of the storage portion 38 that stores the waste ink tank, which cross section is taken along line XVII-XVII in FIG. 15A.

The storage portion 38 is provided on the other side in the Y direction of the movement area where the print head 22 moves. Here, a supply portion 1402 for supplying the print head 22 with ink supplied through the tube 30 is provided on the other side in the Y direction of the carriage 26 on which the print head 22 is mounted. The supply portion 1402 can hold the end side of the tube 30 to be connected so as to extend the end side in the X direction. Thus, in the printing apparatus 10, the print head 22, the supply portion 1402, and the storage portion 38 are arranged in this order in the Y direction. Through the opening 40, the waste ink tank 34 to be stored in the storage portion 38, the print head 22, the supply portion 1402, and the tube 30 are exposed. Thus, the print head 22 and the supply portion 1402 move in the X direction via the carriage 26. In the present embodiment, the carriage 26 and the print head 22 and supply portion 1402 that move in the +X directions as the carriage 26 moves are collectively referred to as a printing unit U.

In the printing apparatus 10, the storage portion 38 is provided in a position where the stored waste ink tank 34 does not overlap the printing unit U in the Y direction. Specifically, as shown in FIG. 14, a gap G is provided between an end position on the other side in the Y direction of the printing unit U (see the two-dot chain line) and an end position on one side in the Y direction of the waste ink tank 34 stored in the storage portion 38 (see the broken line). As a result, in a case when the printing unit U and the waste ink tank 34 overlap each other in the X direction due to the movement of the carriage 26, the printing unit U and the waste ink tank 34 do not contact each other.

In order to pull out the waste ink tank 34 stored in the storage portion 38, it is necessary to open the reader 12 and expose the cover member 36 to the outside. The printing apparatus 10 is provided with a sensor (not shown) capable of detecting the opening and closing of the reader 12, and the opening and closing of the reader 12 is detected by the MPU 302 based on a result of detection by this sensor. In the case of detecting that the reader 12 is opened, the MPU 302 retracts the printing unit U to a retracted position (see FIG. 15A). The retracted position is a position where the waste ink tank 34 and an operator do not contact the printing unit U at the time of storing and pulling out the waste ink tank 34 in and from the storage portion 38. It should be noted that the retracted position may coincide with the standby position where the print head 22 (printing unit U) is located while printing is not performed.

The operator then grips the gripping portion 416 of the waste ink tank 34 stored in the storage portion 38 and moves the waste ink tank 34 in the connection position in the −Y direction to the insertion position (see FIG. 15B). A portion of the waste ink tank 34 in the insertion position is located closer to one side in the Y direction than to the end position (see the two-dot chain line in FIG. 15B) on the other side in the Y direction of the printing unit U (see the hatched portion in FIG. 15B). However, since the printing unit U has moved to the retracted position at this point in time, none of the constituents of the printing unit U interfere with the movement of the waste ink tank 34 from the connection position to the insertion position. Thus, in the present embodiment, a portion of a movement area where the waste ink tank 34 moves in a case when the waste ink tank 34 is stored and pulled out overlaps the movement area where the printing unit U moves. Incidentally, the tube 30 that moves in accordance with the movement of the printing unit U is arranged so as not to contact the waste ink tank 34 in the insertion position in a case when the printing unit U is in the retracted position. After that, the operator moves the waste ink tank 34 in the Z direction and pulls out the waste ink tank 34 from the storage portion 38.

In the case of storing the waste ink tank 34 in the storage portion 38, the above procedure is performed reversely. Specifically, with the reader 12 opened and the printing unit U located in the retracted position, an operator moves the waste ink tank 34 with the gripping portion 416 gripped from the upper side of the opening 40 in the −Z direction to the insertion position (see FIG. 15B). A portion of the waste ink tank 34 in the insertion position is located within the movement area where the printing unit U moves. However, since the printing unit U is in the retracted position, the waste ink tank 34 in the insertion position does not contact the printing unit U and the tube 30. After that, the waste ink tank 34 is moved in the Y direction from the insertion position to the connection position (see FIG. 15A). As a result, the waste ink tank 34 is stored in the storage portion 38.

Here, the waste ink tank 34 is provided with a convex portion 1502 protruding in the X direction at the end on the other side in the Z direction and the end on the other side in the X direction in the case of being stored in the storage portion 38. Further, the storage portion 38 is provided with a restriction portion 1504 which extends in the Y direction and into which the convex portion 1502 of the waste ink tank 34 can be fitted in a case when the waste ink tank 34 is stored. The convex portion 1502 includes a convex portion 420 provided on the side surface 402*c* provided substantially parallel to a YZ plane of the container portion 402 and a convex portion 422 provided on the other side in the X direction of the lid portion 404 (see FIG. 7). The convex portion 420 has a predetermined thickness in the Z direction. On the surface of the convex portion 422, there is provided a position index 1508 to cause an operator to recognize the position of the convex portion 1502 using an index 1506 (to be described later).

The restriction portion 1504 has a concave shape such that the convex portion 1502 can be fitted into the restriction portion 1504 and is configured to restrict the movement of the waste ink tank 34 in the Y direction via the convex portion 1502 to be fitted. Specifically, the restriction portion 1504 restricts the movement in the −Y direction beyond the insertion position of the waste ink tank 34 at one end on one side in the Y direction of the restriction portion 1504 (see FIG. 16B). As a result, it is possible to suppress the contact of the waste ink tank 34 moved in the −Y direction with the tube 30. Further, the restriction portion 1504 restricts the movement of the waste ink tank 34 in the Y direction beyond the connection position at the other end on the other side in the Y direction of the restriction portion 1504 (see FIG. 16A). That is, in the storage portion 38, the restriction portion 1504 restricts, via the convex portion 1502, the upstream side in the Y direction of the movement area where the waste ink tank 34 moves in the insertion position and the other side in the Y direction in the connection position.

Incidentally, the index 1506 is provided in a position adjacent to the restriction portion 1504 in the storage portion 38. Specifically, a first index 1506*a* indicating that the waste ink tank 34 can be pulled out is provided in a position corresponding to the position index 1508 in a case when the convex portion 1502 is in the insertion position in the restriction portion 1504. Further, a second index 1506*b* indicating that the waste ink tank 34 is connected (fixed) is provided in a position corresponding to the position index 1508 in a case when the convex portion 1502 is in the connection position in the restriction portion 1504.

Accordingly, in a case when the waste ink tank 34 in the storage portion 38 is in the connection position, the convex portion 1502 is located at the other end of the restriction portion 1504, and the position index 1508 is located in a position corresponding to the second index 1506*b* (see FIG. 15A). Specifically, the position index 1508 and the second index 1506*b* are aligned in the X direction. Further, in a case when the waste ink tank 34 in the storage portion 38 is in the insertion position, the convex portion 1502 is located at one end of the restriction portion 1504, and the position index 1508 is located in a position corresponding to the first index 1506*a* (see FIG. 15B). Specifically, the position index 1508 and the first index 1506*a* are aligned in the X direction. As a result, an operator can easily determine whether the waste ink tank 34 in the storage portion 38 is in the connection position or the insertion position and whether the waste ink tank 34 can be pulled out from the storage portion 38. Further, since the position index 1508 is provided in the convex portion 1502, it is possible to downsize the waste ink tank 34 as compared with a case when the position index 1508 and the convex portion 1502 are provided separately.

It should be noted that restriction of the movement of the waste ink tank 34 in the Y direction does not have to be performed using the restriction portion 1504 and the convex portion 1502, and various publicly-known techniques can be used. Additionally, the convex portion 1502, the restriction portion 1504, and the index 1506 are provided on the other side in the X direction of the waste ink tank 34 stored in the storage portion 38 but may be provided on the one side in the X direction of the waste ink tank 34.

The storage portion 38 is provided with a latch mechanism 1702 capable of drawing in and fixing the waste ink tank 34 moved to the vicinity of the connection position to the connection position. This makes it easier for an operator to move the waste ink tank 34 to the connection position and suppresses a careless movement of the waste ink tank 34 from the connection position. In the present embodiment, the latch mechanism 1702 functions as a fixing mechanism that fixes the waste ink tank 34 stored in the storage portion 38. It should be noted that such a fixing mechanism is not limited to the latch mechanism 1702, and various publicly-known techniques can be used.

Figure 18A:
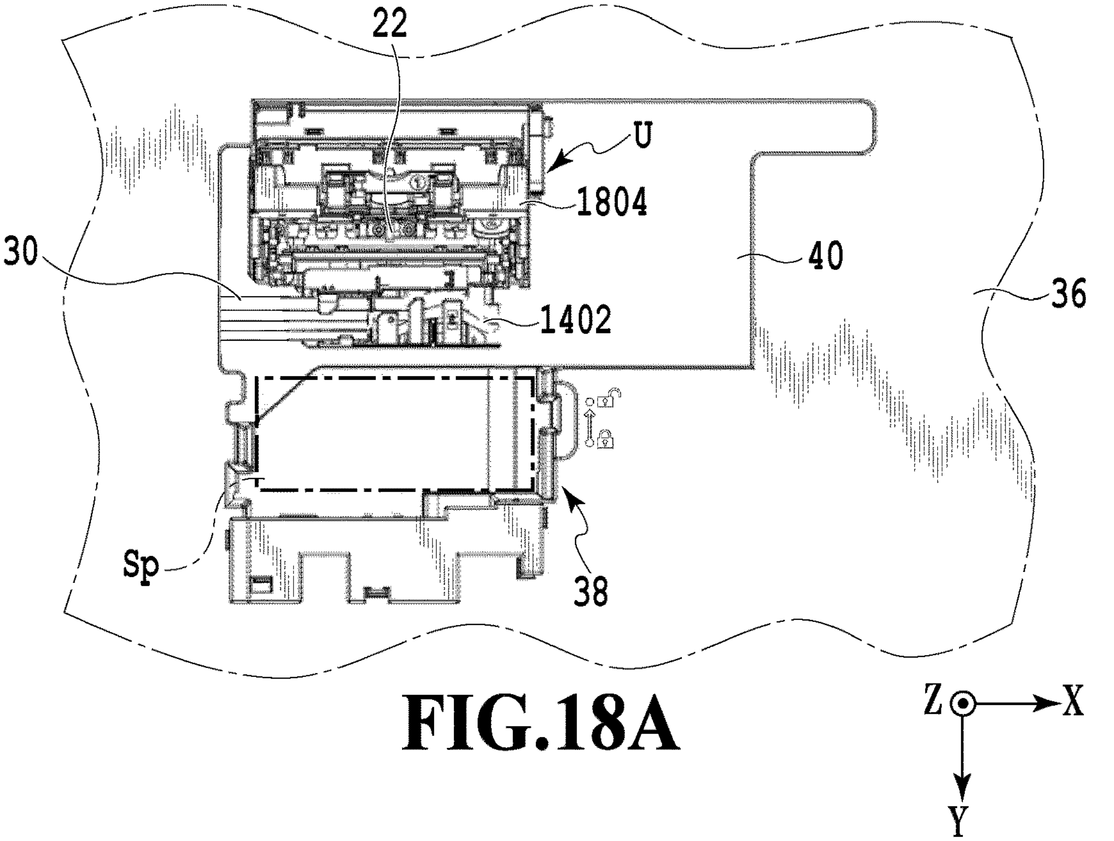
FIGS. 18A and 18B are diagrams for explaining replacement of a print head.
Figure 18B:
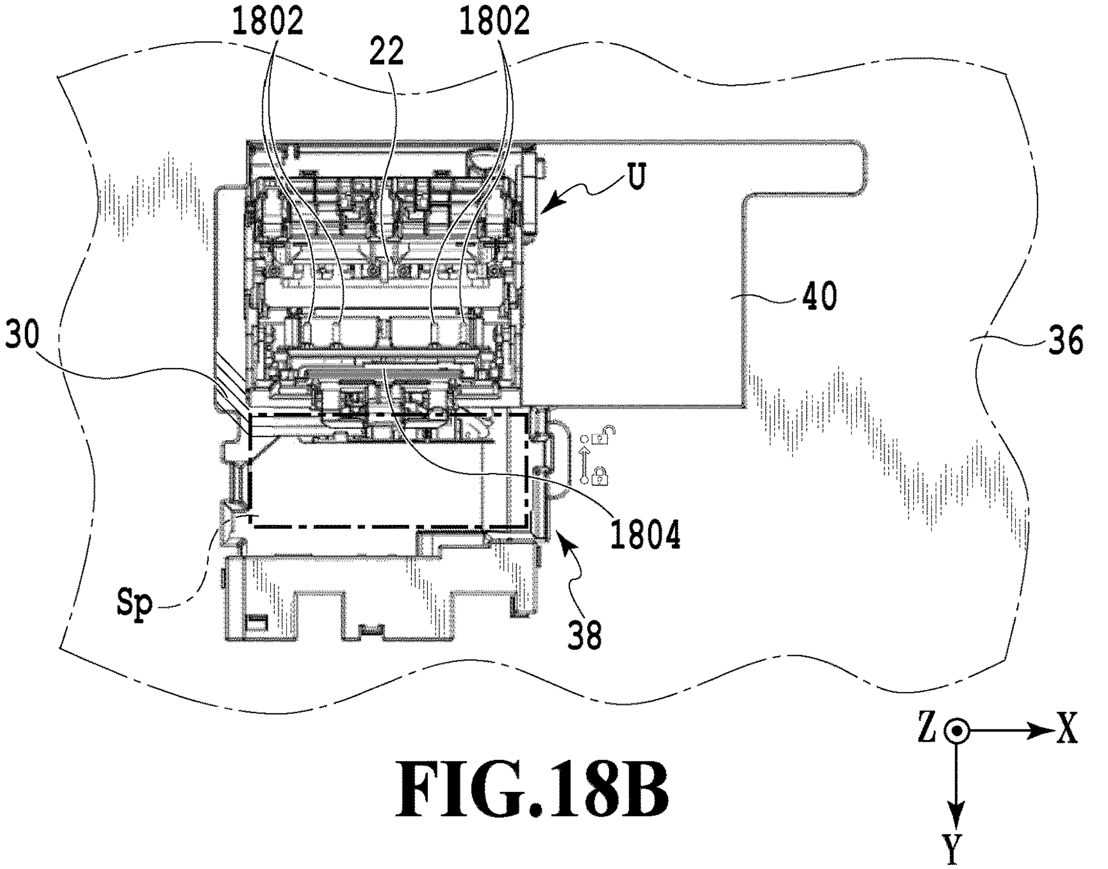

In the printing portion 14, a storage area for storing the waste ink tank 34 in the storage portion 38 is used to replace the print head 22 in the printing unit U. FIGS. 18A and 18B are diagrams for explaining a procedure for replacing the print head 22. FIG. 18A shows a state where the printing unit U is located in a replacement position and FIG. 18B is a diagram showing a state where the supply portion 1402 is removed from the print head 22.

To replace the print head 22 in the printing unit U, space for storing the waste ink tank 34 in the storage portion 38 is used. Accordingly, the print head 22 is replaced with the reader 12 opened and the waste ink tank 34 pulled out from the storage portion 38. In the case of replacing the print head 22, for example, the operation portion 16, or the like, is operated to provide an input to start an operation to replace the print head 22. After the input to start the operation to replace the print head 22 is received, the MPU 302 moves the printing unit U to the replacement position. The replacement position is a position where the supply portion 1402 is accommodated within storage space Sp in the X direction (see FIG. 18A).

Next, the supply portion 1402 is removed from the print head 22 in the printing unit U in the replacement position. Here, in the printing unit U, the supply portion 1402 is configured such that the needle 1802 can be inserted into and removed from the print head 22. The tube 30 is communicated with the needle 1802, and ink supplied from the tube 30 flows into the needle 1802. Thus, the print head 22 is supplied with ink via the needle 1802. Further, the needle 1802 is inserted into or pulled out from the print head 22 by opening and closing a lever portion 1804.

The lever portion 1804 must be opened to remove the supply portion 1402 from the print head 22. In a case when the lever portion 1804 is opened, the supply portion 1402 moves in the Y direction, and the needle 1802 is pulled out from the print head 22 mounted on the carriage 26 (see FIG. 18B). At this time, a portion of the supply portion 1402 is located within the storage space Sp in the storage portion 38. After that, the print head 22 is removed from the carriage 26 and a new print head 22 is mounted on the carriage 26. The lever portion 1804 is then closed, and the supply portion 1402 is moved in the −Y direction. As a result, the needle 1802 is inserted into the print head 22 after replacement mounted on the carriage 26.

In this way, in the case of replacing the print head 22, using the storage space Sp for the waste ink tank 34 in the storage portion 38 makes it possible to use space in the printing portion 14 effectively and contribute to a downsizing of the apparatus.

As described above, in the present embodiment, the movement area where the printing unit U moves overlaps a portion of the movement area at the time of replacing of the waste ink tank 34 in the storage portion 38. Additionally, in the present embodiment, the movement of the waste ink tank 34 during replacement is restricted, and this configuration is used to allow an operator to recognize the position of the waste ink tank 34 during the replacement. Further, at the time of replacing of the print head 22 in the printing unit U, a portion of a movement area where the supply portion that supplies the print head 22 with ink moves overlaps the storage area of the waste ink tank 34 of the storage portion 38. As a result, space in the printing portion 14 can be used effectively, which contributes to a downsizing of the apparatus.

OTHER EMBODIMENTS

Incidentally, the above-described embodiments may be modified as shown in (1) to (6) below.

(1) In the above embodiments, the waste ink tank 34 is provided with the two insertion ports 408, but is not limited to this, and may be provided with one insertion port 408 or three or more insertion ports 408 depending on the kind of ink to be used and the like. Although not specifically described in the above embodiments, the lengths (thicknesses) in the Y direction of the insertion portions 502, 502' are set in consideration of the function of reducing a load to be generated on the needle portion in the reduction portion, the effect of suppressing of waste ink leakage at the time of pulling out the needle portion, and the like.

(2) In the above embodiments, the shielding portion 414 is biased in the −Z direction by the spring 714, but is not limited to this. In the shielding portion 414, instead of the spring 714, for example, an elastic member that generates a reaction force in the −Z direction in a case when a force in the Z direction is applied may be used. Alternatively, the shielding portion 414 may not be biased in the −Z direction. In this case, at the time of pulling out the waste ink tank 34, the shielding portion 414 moves in the −Z direction under its own weight and moves from the open position to the shielding position.

(3) In the above embodiments, the cuts 508, which are reduction portions, are formed in the respective buckling portions 506, and the second openings 604, which are reduction portions, are formed in positions corresponding to the respective sides of the first opening 602, but the present invention is not limited to this. For example, in a case when the needle portion 950 has a substantially elliptical or a substantially rectangular cross section, the cuts 508 and the second openings 604 may be formed only in a position where a load to be generated by the insertion of the needle portion 950 is great.

(4) In the insertion portion 502, a plurality of cuts 504 are formed so as to pass through the center position P1 of the opening area S1, but the present invention is not limited to this. A position where a plurality of cuts 504 intersect may be anywhere within the opening area (within the opening area S1).

(5) In the above embodiments, the insertion port 408 is provided on the side surface 402*a*, which is substantially parallel to the XY plane and is on the other side in the Y direction, and, in the storage portion 38, the waste ink tank 34 is moved in the +Y directions and is displaced between the insertion position and the connection position. However, the present invention is not limited to this. The waste ink tank 34 may also be displaced between the insertion position and the connection position by providing the insertion port 408, for example, on a side surface which is substantially parallel to the YZ plane and is on one side or the other side in the X direction and moving the waste ink tank 34 in the +X directions in the storage portion 38.

(6) The above embodiments and the various forms shown in (1) to (5) above may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A waste ink tank comprising:

a container portion that is substantially box-shaped and is provided with an insertion port into which a discharge member discharging waste ink can be inserted and pulled out from, wherein the insertion port is provided on a side surface of the box-shaped container portion; and a shielding portion movable between a shielding position where the insertion port is shielded and an open position where the insertion port is opened.

2. The waste ink tank according to claim 1, wherein the shielding portion is biased in a predetermined direction, is located in the shielding position, and is movable from the shielding position to the open position against the biasing.

3. The waste ink tank according to claim 2, further comprising a connection terminal capable of electrical connection, wherein the connection terminal is located closer to an end side in the predetermined direction than to the insertion port and is provided in a position deviated from the insertion port in a direction intersecting the predetermined direction and directions in which the discharge member is inserted and pulled out.

4. The waste ink tank according to claim 1, wherein the container portion comprises a restriction member that restricts movement of the shielding portion beyond the shielding position in a case when the shielding portion moves from the open position to the shielding position and restricts movement of the shielding portion beyond the open position in a case when the shielding portion moves from the shielding position to the open position.

5. The waste ink tank according to claim 1, further comprising a gripping portion that is provided on an upper surface of the container portion and that can be gripped.

6. The waste ink tank according to claim 5, wherein the gripping portion is located above a center position of gravity in a case when the container portion is filled with waste ink.

7. The waste ink tank according to claim 5, wherein at least a portion of the gripping portion overlaps the insertion port in a direction intersecting a gravitational direction and directions in which the discharge member is inserted and pulled out.

8. A printing apparatus comprising:

a printing unit configured to eject ink onto a printing medium;

a recovery unit configured to receive waste ink;

a storage portion configured to store a waste ink tank; and a discharge member configured to be able to be inserted into and pulled out from an insertion port provided in the waste ink tank and capable of discharging the waste ink, received by the recovery unit, to the waste ink tank, wherein the waste ink tank comprises a shielding portion movable between a shielding position where the insertion port is shielded and an open position where the insertion port is opened, and wherein the storage portion comprises a cover that covers an upper side of the discharge member and moves the shielding portion from the shielding position to the open position in a case when the waste ink tank is inserted.

9. The printing apparatus according to claim 8, wherein the cover is adjacent to the waste ink tank in a case when the discharge member is inserted into the waste ink tank, and has a side adjacent to the waste ink tank, a shape of the side corresponding to a shape of the waste ink tank adjacent to the side.

10. The printing apparatus according to claim 8, wherein, in a case when the discharge member is inserted into the waste ink tank, the cover overlaps a portion of the waste ink tank in directions in which the discharge member is inserted and pulled out.

11. The printing apparatus according to claim 8, wherein the storage portion comprises a guide portion that guides the waste ink tank between a first position where the waste ink tank is inserted and a second position where the discharge member is inserted into the insertion port while maintaining a state where the shielding portion is located in the open position.

12. The printing apparatus according to claim 8, wherein the waste ink tank has a side surface on which the insertion port is provided, and further comprises a gripping portion that can be gripped on an upper surface.

13. The printing apparatus according to claim 8, wherein the printing unit ejects ink onto a print medium to be conveyed, while moving in a direction intersecting a direction in which the print medium is conveyed, the storage portion is located so as to be adjacent to a movement area where the printing unit moves in the conveyance direction and is configured to be movable from a first position where the waste ink tank is inserted to a second position, where the discharge member is inserted into the insertion port and connected to the waste ink tank, and a portion of a movement area where the waste ink tank moves between the first position and the second position overlaps the movement area where the printing unit moves.

14. The printing apparatus according to claim 13, wherein the printing unit is retracted to a retraction position where the waste ink tank is not contacted, in a case when the waste ink tank stored in the storage portion is replaced.

15. The printing apparatus according to claim 13, wherein the storage portion comprises a restriction portion capable of restricting movement of the waste ink tank in the first position and the second position.

16. The printing apparatus according to claim 15, wherein the restriction portion is formed in a concave shape extending in the conveyance direction and is fitted to a convex portion protruding in a direction intersecting a gravitational direction and the conveyance direction in the waste ink tank.

17. The printing apparatus according to claim 16, wherein the convex portion in the waste ink tank is provided with a position index for causing a position of the waste ink tank to be recognized, and the storage portion is provided with a first index indicating that the waste ink tank can be pulled out in a position corresponding to the position index in a case when the waste ink tank is located in the first position, and is provided with a second index indicating that the waste ink tank is connected in a position corresponding to the position index in a case when the waste ink tank is located in the second position.

18. The printing apparatus according to claim 13, wherein the storage portion comprises a fixing mechanism configured to draw the waste ink tank from near the second position into the second position, and to fix the waste ink tank.

19. The printing apparatus according to claim 13, wherein the printing unit comprises:

a print head with a mechanism for ejecting ink onto a printing medium;

a carriage on which the print head is mounted and that can move in a direction intersecting a gravitational direction and the conveyance direction; and a supply portion capable of supplying the print head with ink, the supply portion being movable in the conveyance direction between a position where the supply portion is inserted into the print head so as to be able to supply the print head with the ink and a position where the supply portion is pulled out from the print head, and a portion of a movement area where the supply portion moves overlaps a storage space for storing the waste ink tank in the storage portion.

* * * * *